(12) United States Patent (10) Patent No.: US 8,713,422 B2
Chamberlain et al. (45) Date of Patent: Apr. 29, 2014

(54) FOR A GIVEN CELL IN A SPREADSHEET, EVALUATING AN UNLIMITED NUMBER OF CONDITIONAL FORMATTING RULES AND APPLYING MULTIPLE CORRESPONDING FORMATS TO THE CELL

(75) Inventors: Benjamin C. Chamberlain, Redmond, WA (US); Bruce Cordell Jones, Bellevue, WA (US); Christopher M. Street, Redmond, WA (US); Eric B. Vigesaa, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 201 days.

(21) Appl. No.: 12/618,446

(22) Filed: Nov. 13, 2009

(65) Prior Publication Data

US 2010/0122152 A1 May 13, 2010

Related U.S. Application Data

(63) Continuation of application No. 11/337,762, filed on Jan. 23, 2006, now Pat. No. 7,634,717.

(51) Int. Cl.
 *G06F 17/21* (2006.01)
(52) U.S. Cl.
 USPC .......................................................... 715/217
(58) Field of Classification Search
 USPC .......................................................... 715/217
 See application file for complete search history.

(56) References Cited

U.S. PATENT DOCUMENTS

| | | | |
|---|---|---|---|
| 6,085,202 A | 7/2000 | Rao | |
| 6,349,315 B1 * | 2/2002 | Sonoyama et al. | 715/209 |
| 6,640,234 B1 | 10/2003 | Coffen et al. | |
| 6,851,088 B1 | 2/2005 | Conner et al. | |
| 2005/0063365 A1 * | 3/2005 | Mathew et al. | 370/352 |
| 2005/0132284 A1 | 6/2005 | Lloyd et al. | |

FOREIGN PATENT DOCUMENTS

| | | |
|---|---|---|
| EP | 0 619 549 A1 | 10/1994 |
| JP | 10-187679 | 7/1998 |

OTHER PUBLICATIONS

Abramovich, S., et al., "Spreadsheet Conditional Formatting: An Untapped Resource for Mathematics Education," Oct. 5, 2005.
Gautier, S., "How to Apply Conditional Formatting to a Cell," Jan. 27, 2002 <http://cdrom.gnutemberg.org/openoffice/ht_calc_beg_03_en.pdf.
"XL97: Condition Format Applies Format for First Condition," Microsoft.com, Oct. 22, 2000 <http:support.microsoft.com/kb/157938/en-us>.
"XL98: Condition Format Applies Format for First Condition," Microsoft.com, Sep. 11, 2002 <http:support.microsoft.com/kb/178965/en-us>.
Notice of Allowance in Chinese Patent Application No. 200780002891.2 mailed Jan. 12, 2012, 4 pages.
Notice of Allowance in Russian Patent Application No. 2008130412 mailed Mar. 29, 2011, 6 pages.

(Continued)

*Primary Examiner* — Laurie Ries
*Assistant Examiner* — Tionna Smith
(74) *Attorney, Agent, or Firm* — Jim Ros; Micky Minhas

(57) ABSTRACT

Generally described, embodiments of the present invention relate to applying and evaluating conditional formatting rules to a given range of cells. Additionally, multiple conditional formatting rules may be evaluated to TRUE for the same cell contained in a user interface and multiple formats applied to that cell.

31 Claims, 21 Drawing Sheets

(56) References Cited

OTHER PUBLICATIONS

Notice of Allowance in Japanese Patent Application No. 2008-552338 mailed Jan. 15, 2010, 6 pages.
Office Action in Russian Patent Application No. 2008130412 mailed Dec. 16, 2010, 6 pages.
Friedman et al., Creating an Excel-Based Executive Support System, Wiley Periodicals, Inc. copyright 2004, 7 pages.
Pearson, Charles H., Conditional Formatting, copyright 1997-2003, 4 pages.
Stein, Justin D., Spreadsheet Smarts, AICPA, copyright 2008, 4 pages.
Supplementary Search Report in Application No. EP 0707620389.0, mailed May 24, 2012, 11 pages.
Oppenheimer, Diego M., "More about Conditional Formatting", Published on: Oct. 13, 2005, Available at: http://blogs.office.com/b/microsoft-excel/archive/2005/10/13/more-about-conditional-formatting.aspx.
Schuyler, John, "Conditional Cell Formatting in Excel", Published on: Jan. 2001, Available at: http://www.maxvalue.com/tip080.htm.
"MS Excel: Automatically Highlight Highest and Lowest Values in a Range of Cells in Excel 2003/XP/2000/97", Published on: Oct. 1, 2005, Available at: http://www.techonthenet.com/excel/questions/cond_format3.php.

\* cited by examiner

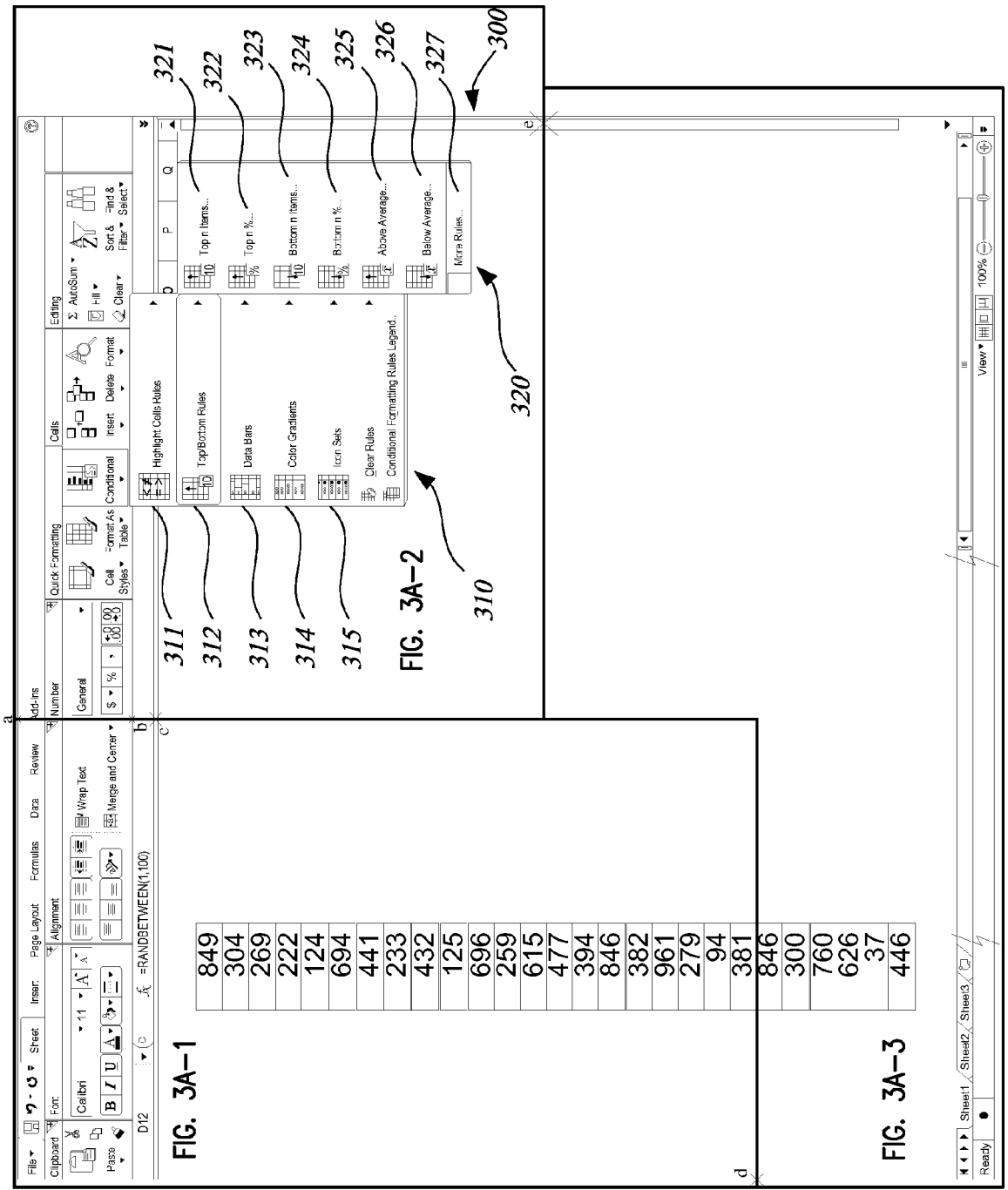

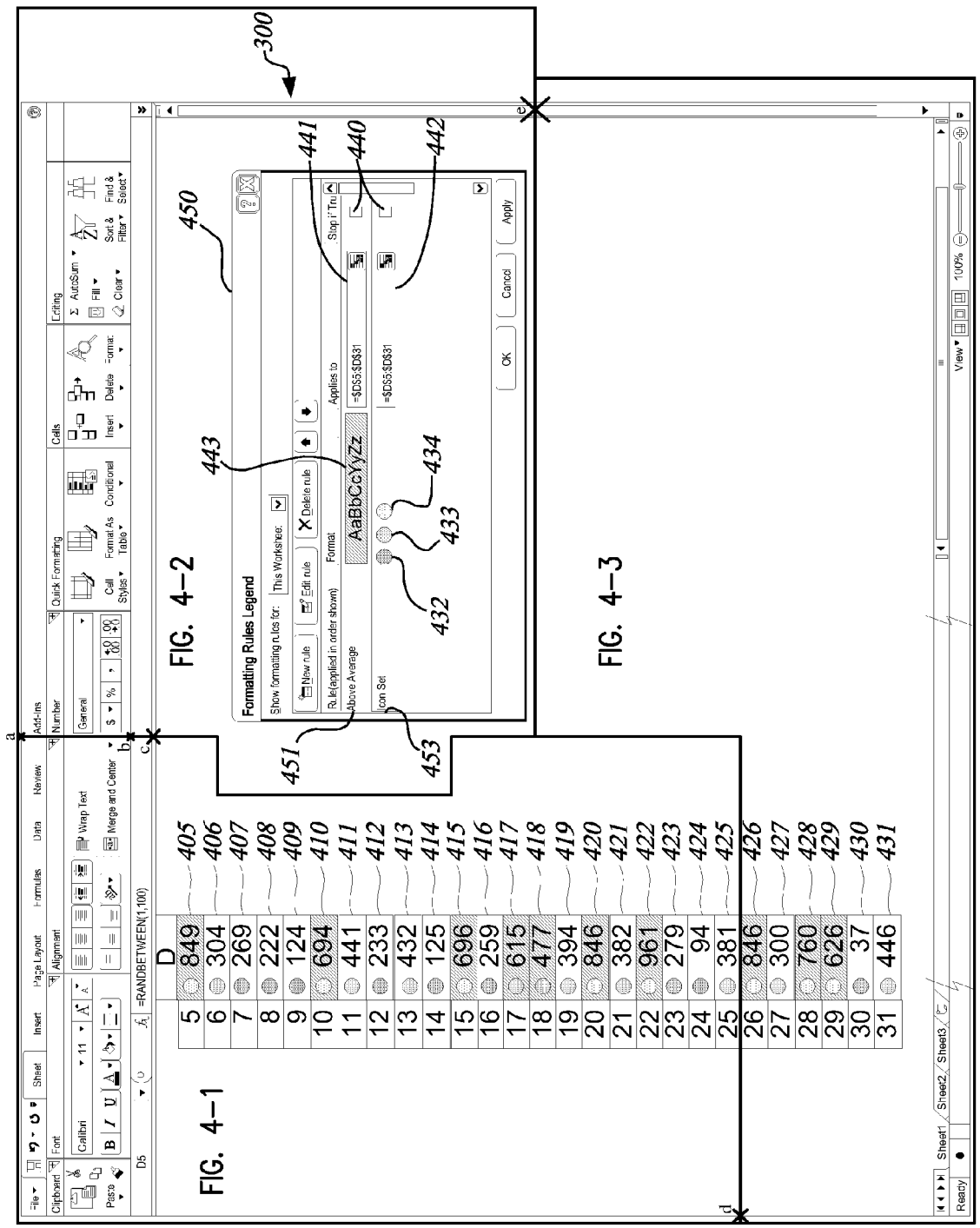

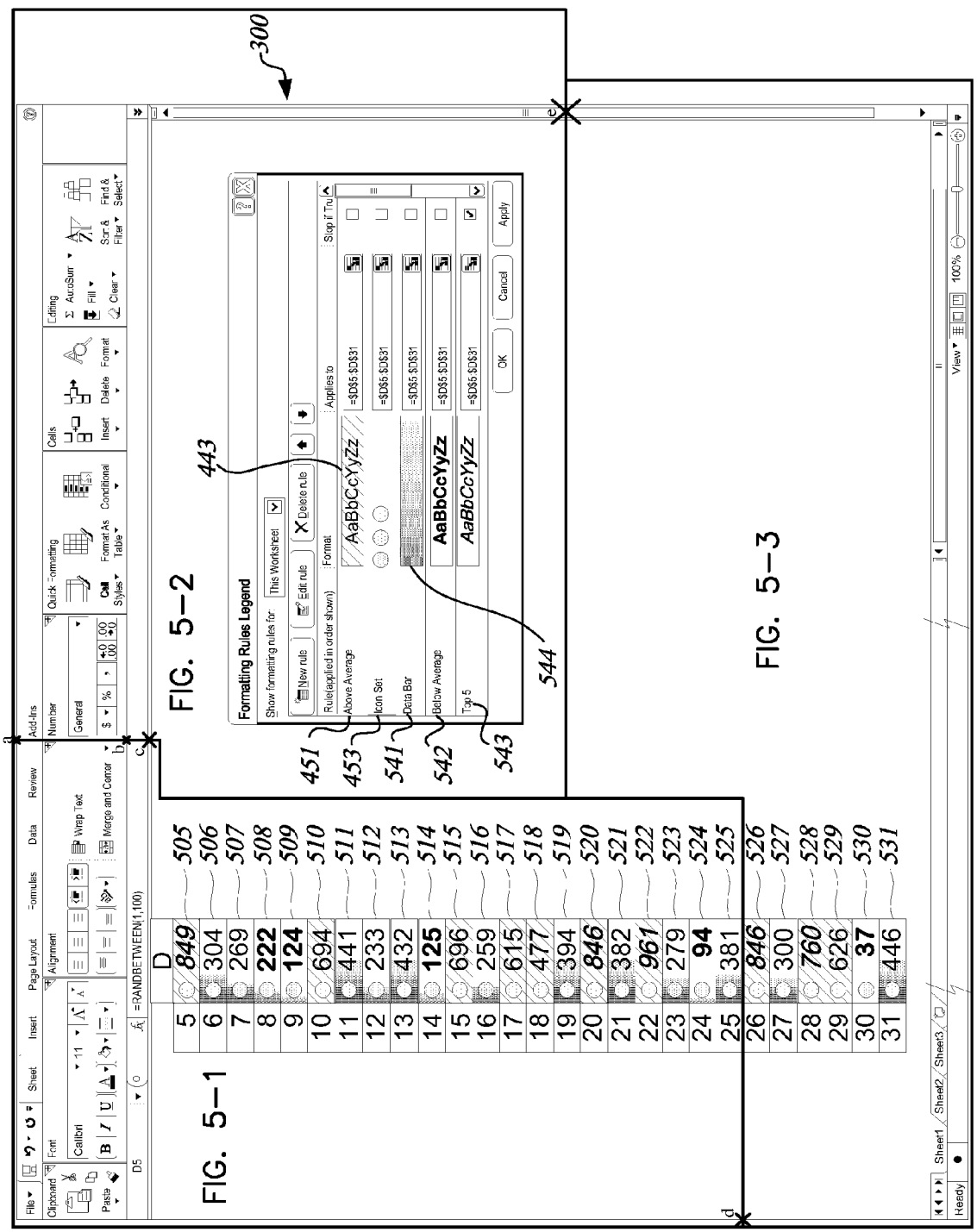

FIG. 5-1

| | D | |
|---|---|---|
| 5 | *849* | — 505 |
| 6 | 304 | — 506 |
| 7 | 269 | — 507 |
| 8 | 222 | — 508 |
| 9 | 124 | — 509 |
| 10 | 694 | — 510 |
| 11 | 441 | — 511 |
| 12 | 233 | — 512 |
| 13 | 432 | — 513 |
| 14 | 125 | — 514 |
| 15 | 696 | — 515 |
| 16 | 259 | — 516 |
| 17 | 615 | — 517 |
| 18 | 477 | — 518 |
| 19 | 394 | — 519 |
| 20 | *846* | — 520 |
| 21 | 382 | — 521 |
| 22 | *961* | — 522 |
| 23 | 279 | — 523 |
| 24 | 94 | — 524 |
| 25 | 381 | — 525 |

Cell: D5, formula: =RANDBETWEEN(1,100)

FOR A GIVEN CELL IN A SPREADSHEET, EVALUATING AN UNLIMITED NUMBER OF CONDITIONAL FORMATTING RULES AND APPLYING MULTIPLE CORRESPONDING FORMATS TO THE CELL

CROSS REFERENCE TO RELATED APPLICATIONS

This application claims priority to U.S. patent application Ser. No. 11/337,762, filed Jan. 23, 2006, entitled MULTIPLE CONDITIONAL FORMATTING, now U.S. Pat. No. 7,634,717, issued on Dec. 15, 2009, the disclosure of which is incorporated by reference herein in its entirety.

BACKGROUND

Data visualization techniques and conditional formatting of data enable users to scan and quickly comprehend large quantities of information. Such techniques may also aid in alerting users to anomalies and other data of interest. Visualization tools can include charts, graphs, and reports that collect, summarize, and/or otherwise transform data into meaningful shapes, colors, and patterns. Closer to the source, data visualization has also included the use of conditional formatting in user interfaces, such as spreadsheets, which frequently serve as receptacles of raw data.

Conditional formatting enables users to modify the look of data in place, for example, in a cell by changing the appearance of the cell based on the content of the cell (or some other determining condition). FIG. 1 depicts a prior art range of cells 100 that is typically present in a user interface, the cells of which are conditionally formatted. Here, cell A1 provides an example of the default or unformatted version of a cell. Cell A2 provides an example of a first conditionally formatted cell, and cell A4 provides an example of a second conditionally formatted cell. Cells A2 and A4 received new formatting automatically based on a condition associated with the cells.

FIG. 2 depicts a prior art dialog 200 where formats conditioned upon values being within certain ranges are selected. The two conditions supplied here (and applied to the range of cells 100) format cells in a particular fashion when the value contained within each is evaluated as being between a certain range (10 and 20 for condition 1, 15 and 30 for condition 2). The conditions utilized in conditional formats are limited to two possible Boolean outputs—TRUE or FALSE. If the condition supplied evaluates to TRUE, then the format is applied. If the condition supplied evaluates to FALSE, then the format is not applied.

Dialog 200 demonstrates that, while useful, conditional formatting can be limiting as to certain available formats (e.g., font, cell color, borders). Furthermore, a given range of cells is provided a maximum of three conditional formats that can be applied, each providing no more than one possible format when evaluating to TRUE. Still further, once a condition for a cell is evaluated to TRUE, no additional conditions for that cell are evaluated and thus, no additional formatting is applied to the cell.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Generally described, embodiments of the present invention relate to applying and evaluating an unlimited number of conditional formatting rules to a given range of cells. Additionally, multiple conditional formatting rules may be evaluated to TRUE for the same cell contained in a user interface and multiple formats applied to that cell.

In accordance with one aspect, a method for applying multiple conditional formatting rules to a plurality of data cells is provided. In that method a range of data cells for which multiple conditional formatting rules are to be applied is determined. For the determined range, a condition type and format type that are to be applied is also determined and associated with the range of cells. Parameters that are used determine if the formatting type is to be applied are also associated with the cells. A priority for the conditional formatting rule is also specified with respect to other conditional formatting rules. Assigning a priority to conditional formatting rules provides the ability to evaluate multiple conditional formatting rules in a logical manner.

In accordance with another aspect, a method for evaluating multiple conditional formatting rules applied to a user interface is provided. To accomplish the task of evaluating multiple conditional formatting rules, a first rule is selected and a cell associated with the selected rule is identified for the evaluation. Upon selection of a cell, the conditional formatting rule is evaluated to determine if the condition evaluates to TRUE. If the condition evaluates to TRUE, it is determined if a format type associated with the conditional formatting rule conflicts with a format type previously applied to the cell. If the format type does not conflict with a previously applied format type, the formatting is applied to the cell.

In accordance with still another aspect of the present invention, a computer-readable medium having computer executable components for applying and evaluating multiple conditional formatting rules is provided. The components include a conditional formatting rules control component, a conditional formatting rules evaluation component, and a formatting resolution component. The conditional formatting rules control component controls the priority ranking for a plurality of conditional formatting rules associated with a user interface. The conditional formatting rules evaluation component is used to evaluate a first conditional formatting rule for a cell that is part of the user interface. Finally, the formatting resolution component determines if a formatting type of the first conditional formatting rule conflicts with a formatting type previously applied to the cell being evaluated.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3A-1 is a first portion of the block diagram shown in FIG. 3A;

FIG. 3A-2 is a second portion of the block diagram shown in FIG. 3A;

FIG. 3A-3 is a third portion of the block diagram shown in FIG. 3A;

FIG. 3B-1 is a first portion of the block diagram shown in FIG. 3B;

FIG. 3B-2 is a second portion of the block diagram shown in FIG. 3B;

FIG. 3B-3 is a third portion of the block diagram shown in FIG. 3C;

FIG. 4-1 is a first portion of the block diagram shown in FIG. 4;

FIG. 4-2 is a second portion of the block diagram shown in FIG. 4;

FIG. 4-3 is a third portion of the block diagram shown in FIG. 4;

FIG. 5-1 is a first portion of the block diagram shown in FIG. 5;

FIG. 5-2 is a second portion of the block diagram shown in FIG. 5;

FIG. 5-3 is a third portion of the block diagram shown in FIG. 5;

DETAILED DESCRIPTION

Generally described, embodiments of the present invention relate to applying and evaluating an unlimited number of conditional formatting rules to a given range of cells. More specifically, the present invention relates to a user interface that may be provided as part of a stand-alone system or in conjunction with a network-based system that provides the ability for a user to apply multiple conditional formatting rules to a range of cells and have all of those conditional formatting rules evaluated. Although the present invention will be described with relation to illustrative user interfaces and operating environments, one skilled in the relevant art will appreciate that the disclosed embodiments are illustrative in nature and should not be construed as limiting.

Formats need not be evaluated using only TRUE or FALSE as determinative results. Instead, cell formats applied can vary depending upon an associated value (e.g., the value in the cell itself), providing more formats that may be more meaningful to a user. Formats may be applied to a range of cells where a format value is determined for each cell in the range and one or more aspects of the format vary based on the format value. For example, as the value in a cell increases, the background color or shade is adjusted, the size of an in-cell data bar grows, or the selection of an in-cell icon changes.

Additionally, as described in more detail below, there need not be a limit to the number of conditional formatting rules that can be applied to a cell or range of cells within a user interface. For example, referring briefly to FIG. 5, any number of conditional formatting rules may be applied to a cell or range of cells. In further contrast to the prior art, in an embodiment of the present invention, multiple conditional formatting rules may be evaluated for a particular cell and the format for each rule that is evaluated to TRUE may be applied to the cell, provided that it does not conflict with a format applied by a prior conditional formatting rule.

Figure 1:
FIG. 1 depicts a prior art example of a range of conditionally formatted cells in a user interface.
Figure 2:
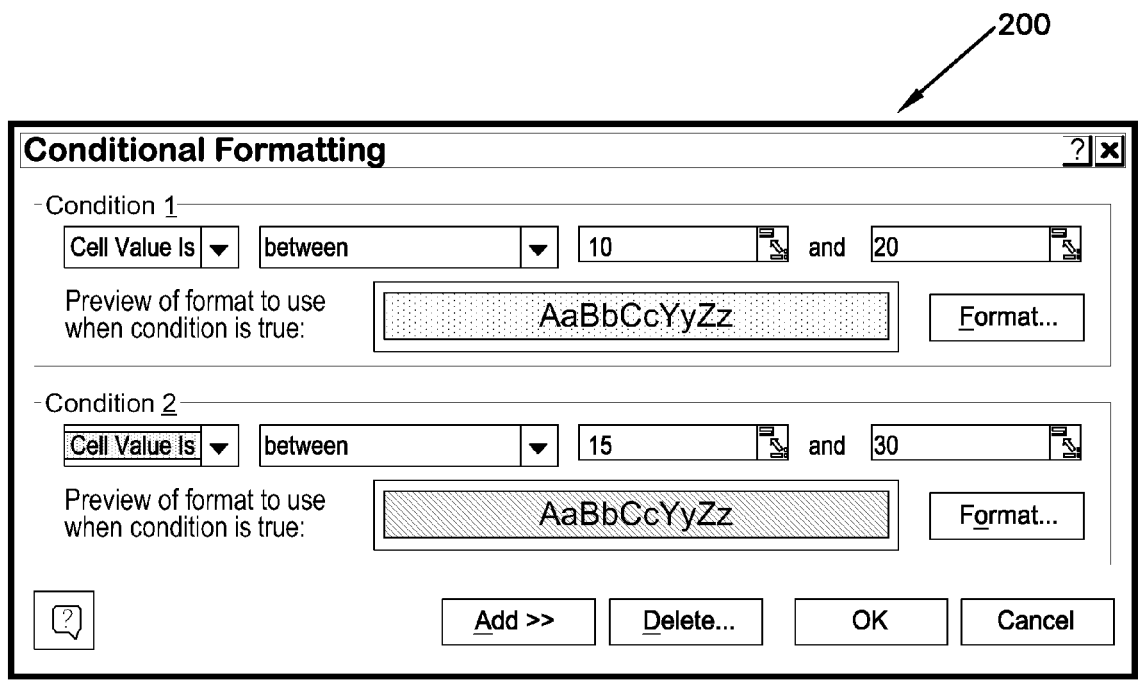
FIG. 2 depicts a prior art example of a dialog for conditionally formatting cells.
Figures 1, 3A:
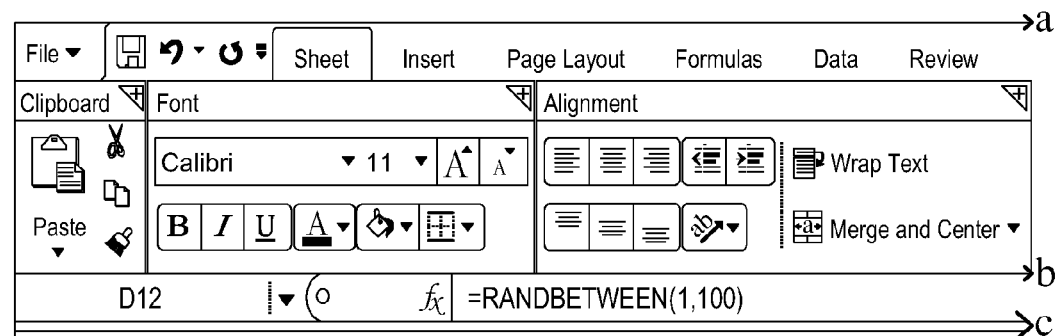
FIG. 3A is a block diagram of a user interface that provides a user with the ability to apply multiple conditional formatting rules to a cell, or range of cells.
Figures 2, 3A:
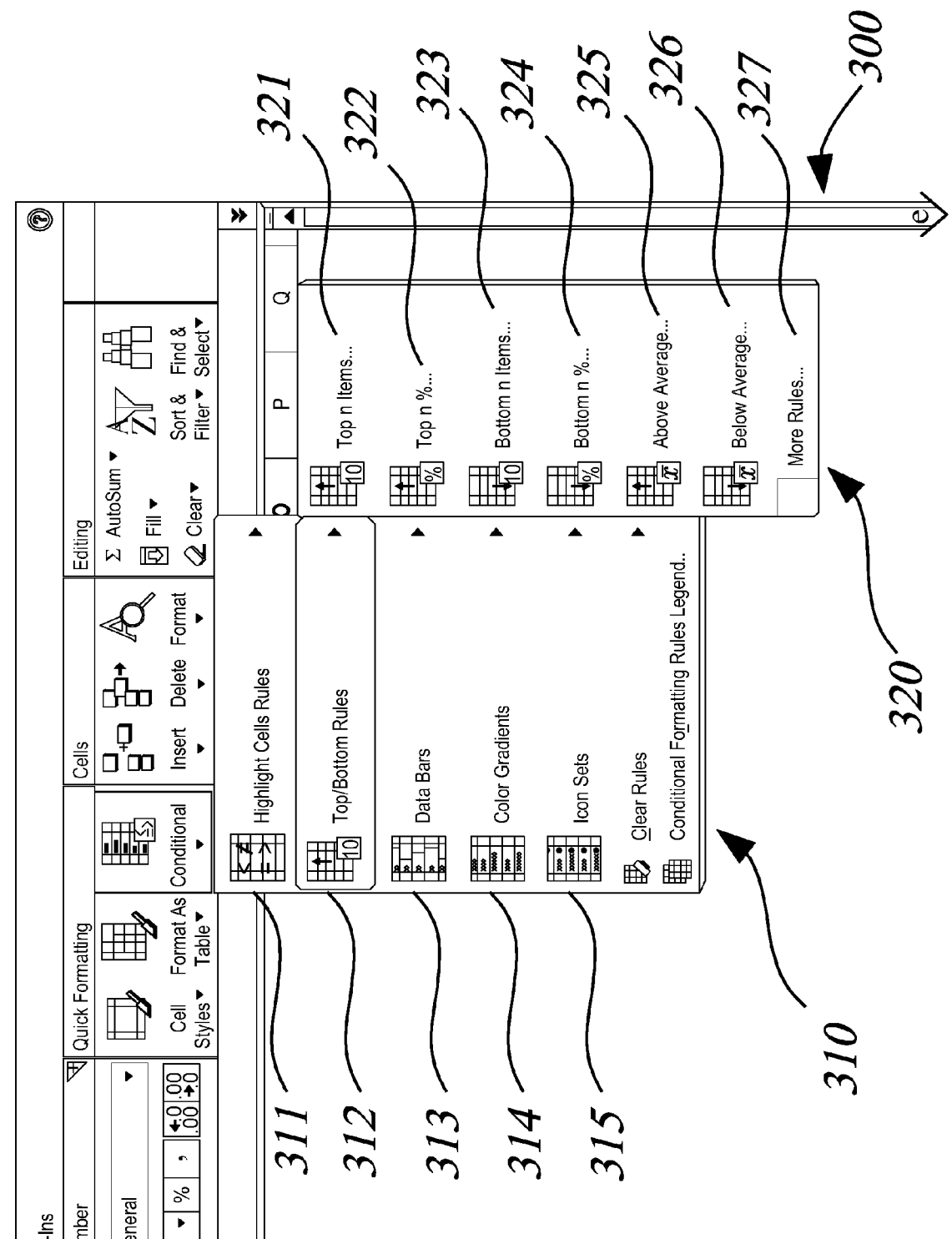
Figures 3, 3A:
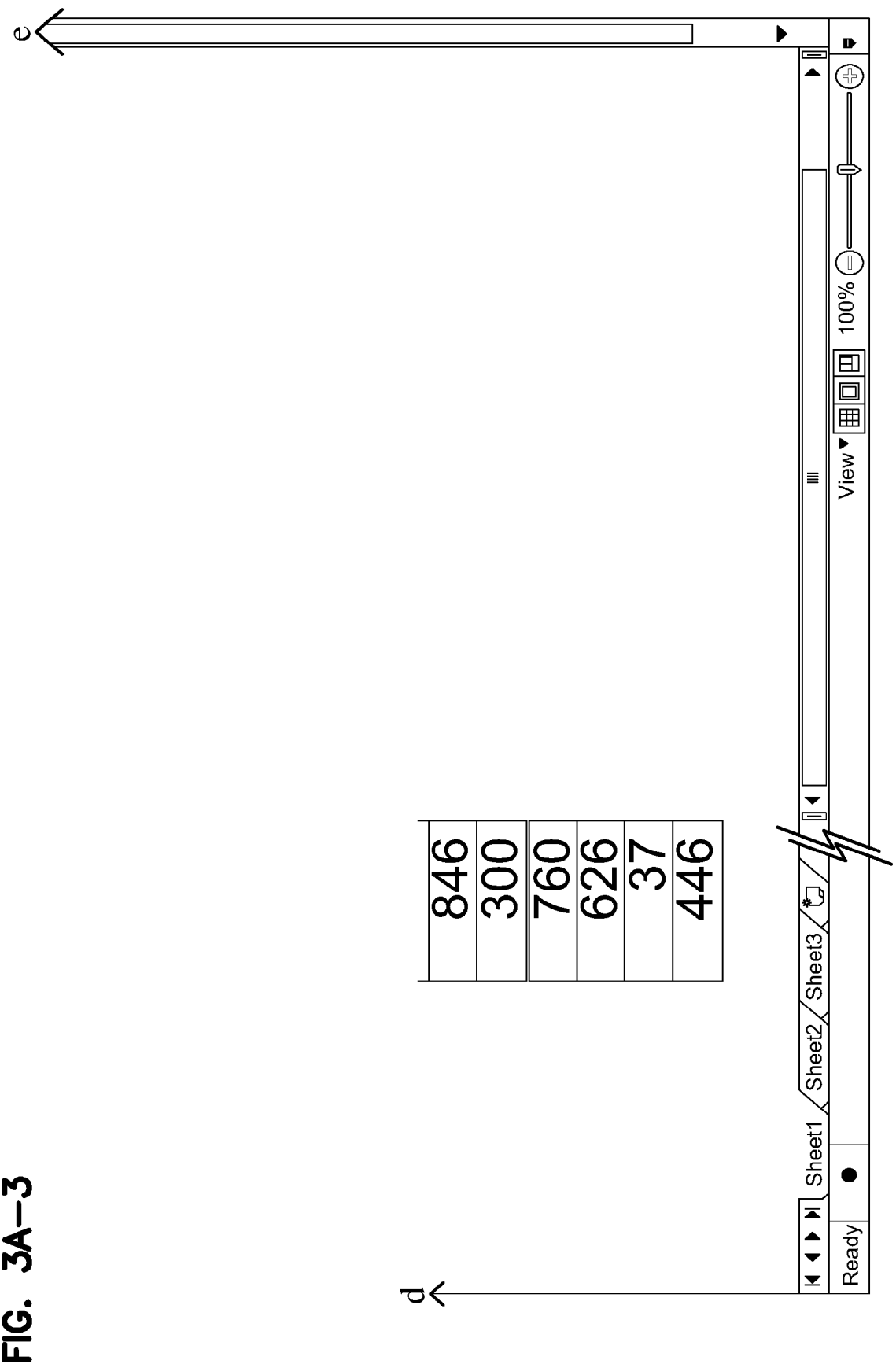

FIG. 3A (including FIGS. 3A-1, 3A-2, and 3A-3) is a block diagram of a user interface 300 that provides a user with the ability to apply multiple conditional formatting rules to a cell or range of cells within a user interface, in accordance with an embodiment of the present invention. From a drop-down menu 310, a user may select a conditional formatting rule for application to a range of cells. To ease this selection, predefined conditional formatting rules may be provided to a user and organized into group views. For example, the initial drop-down menu 310 identifies a high level set of conditional formatting rule groups 311, 312, 313, 314, 315, each group containing one or more predefined conditional formatting rules. For example, the conditional formatting rule group "Top/Bottom Rules" 312 includes the predefined conditional formatting rules of "Top n Items" 321, "Top n %" 322, "Bottom n Items" 323, "Bottom n %" 324, "Above Average" 325, and "Below Average" 326, each as specified by the sub-drop-down menu 320. Additional rules that are part of the "Top/Bottom" 312 conditional formatting rules group may also be viewed by selecting the "More Rules" 327. As specified by the names, each of the predefined conditional formatting rules that are part of the conditional formatting rules group Top/Bottom Rules 312 relates to identification of the top or bottom number of cells in a range of cells.

A user may select one of the predefined rules by selecting its name from the sub-drop-down 320 and provide specific parameters that the rule is to use for evaluation. For example, if a user selects the conditional formatting rule of "Top n Items" 321, the user will be provided the ability to specify the number "n" of top items that are to be identified. In addition to identifying the specific parameters for the conditional formatting rule, a user may also select the formatting that is to be applied to the cells that are evaluated as TRUE. If a user selects the rule of "Top n Items" 321, provides the parameter of n=5, and selects to have the values of those cells displayed in italics, the five cells in the range of selected cells that include the top five values will display those values with italics. In the example provided in FIG. 5, the cells 505, 520, 522, 526, 528 include the top five values and when the rule is evaluated, each of those values is displayed in italics, thereby visually distinguishing those cells from the other cells in the selected range.

Figures 2, 5:
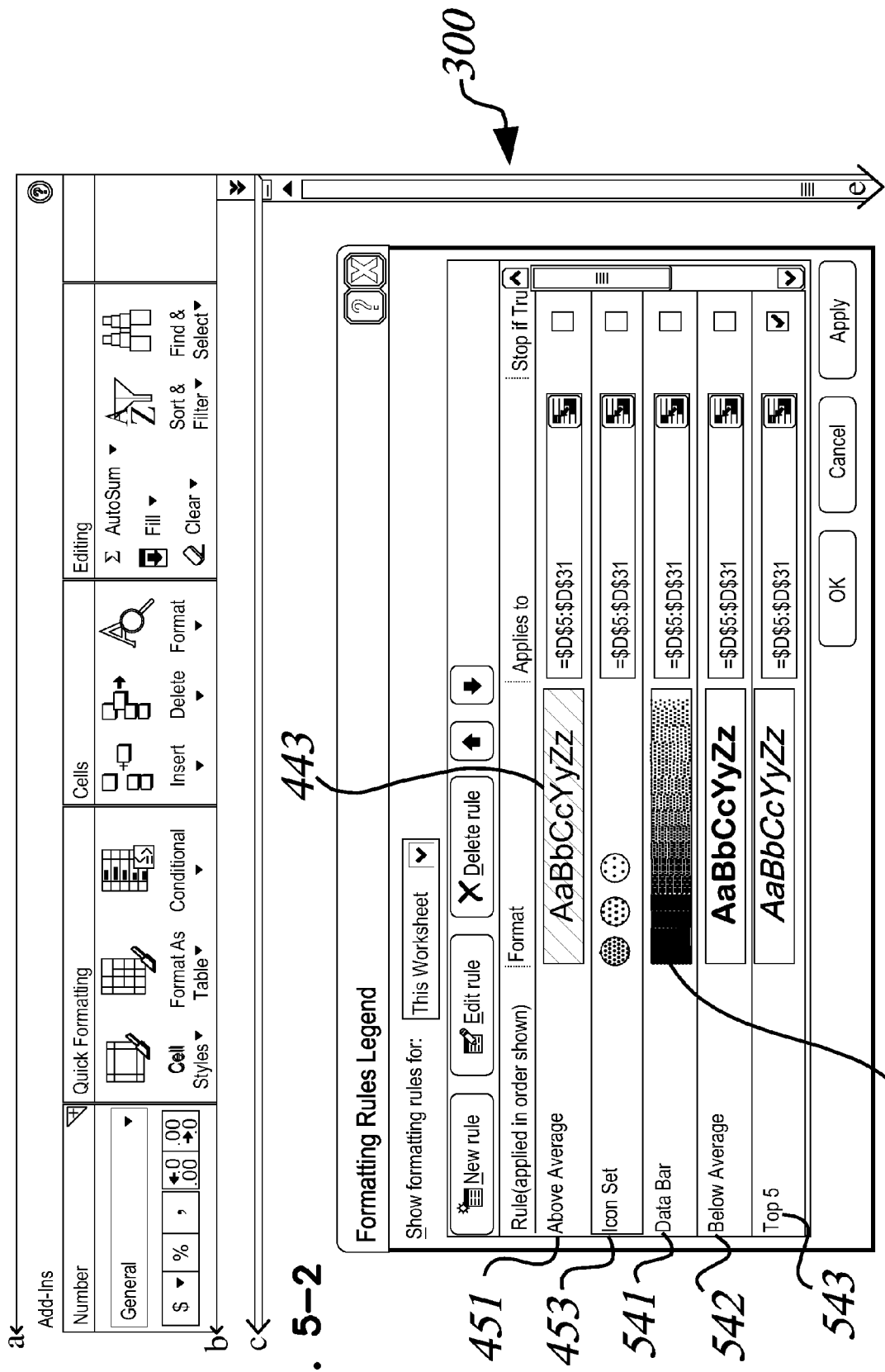
FIG. 5 is a block diagram of a user interface illustrating the application and evaluation of multiple conditional formatting rules in which some format types are not applied to cells because of conflicting format types of higher priority conditional formatting rules, according to an embodiment of the present invention.
Figures 3, 5:
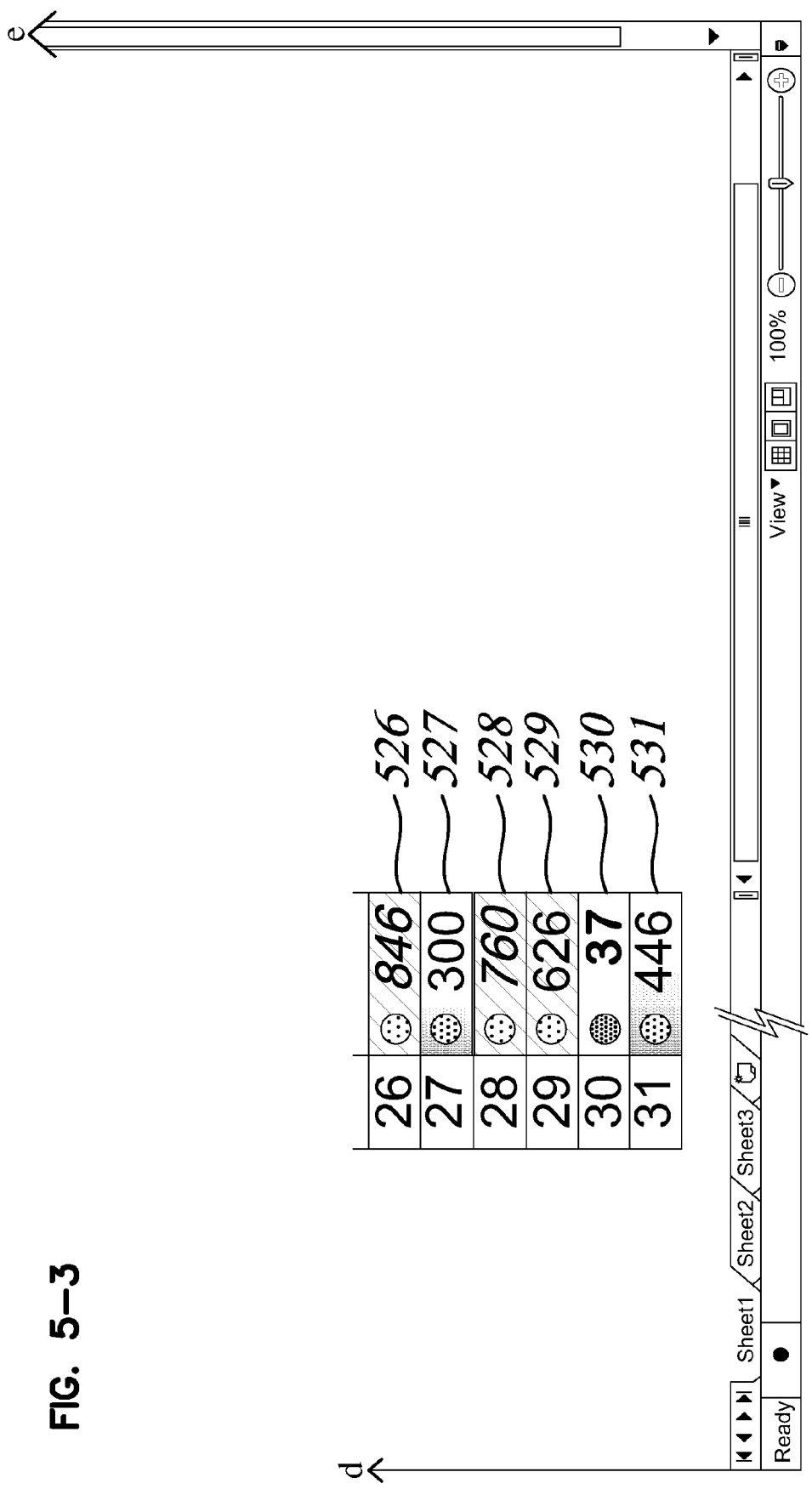

As described in more detail with respect to FIG. 5, to enable the ability to evaluate multiple conditional formatting rules and apply multiple formats to cells in a user interface without resulting in conflicting formats being applied to a cell, in one embodiment, rules are prioritized at the level of the user interface.

Figure 3B:
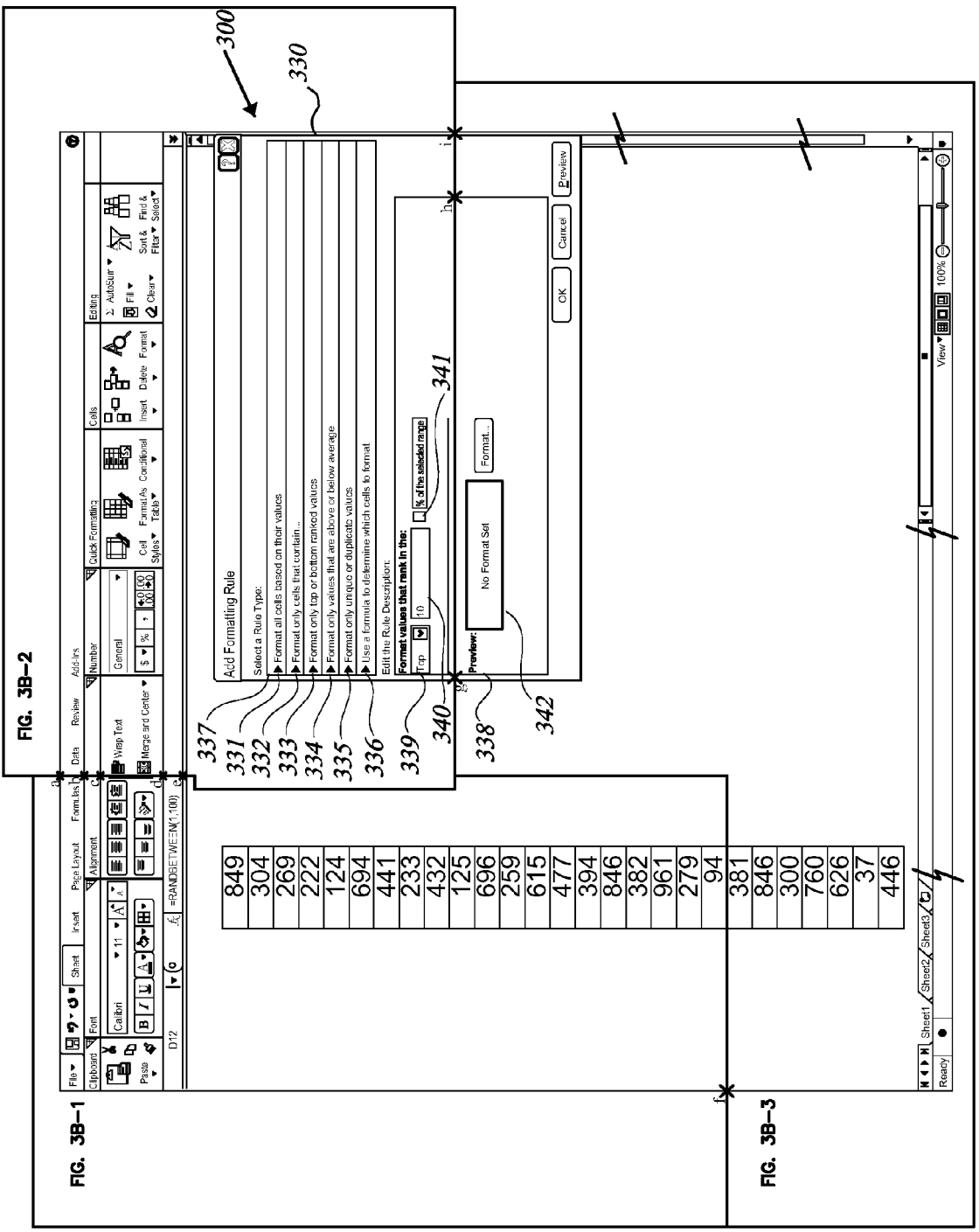
FIG. 3B is another block diagram of a user interface that provides a user with the ability to apply multiple conditional formatting rules to a cell, or range of cells.
Figures 1, 3B:
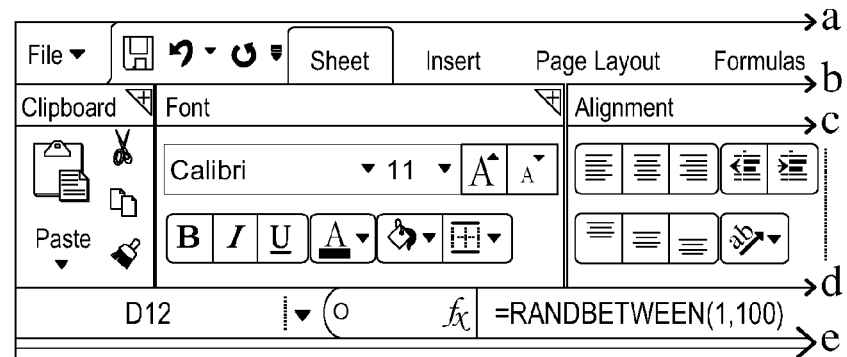
Figures 2, 3B:
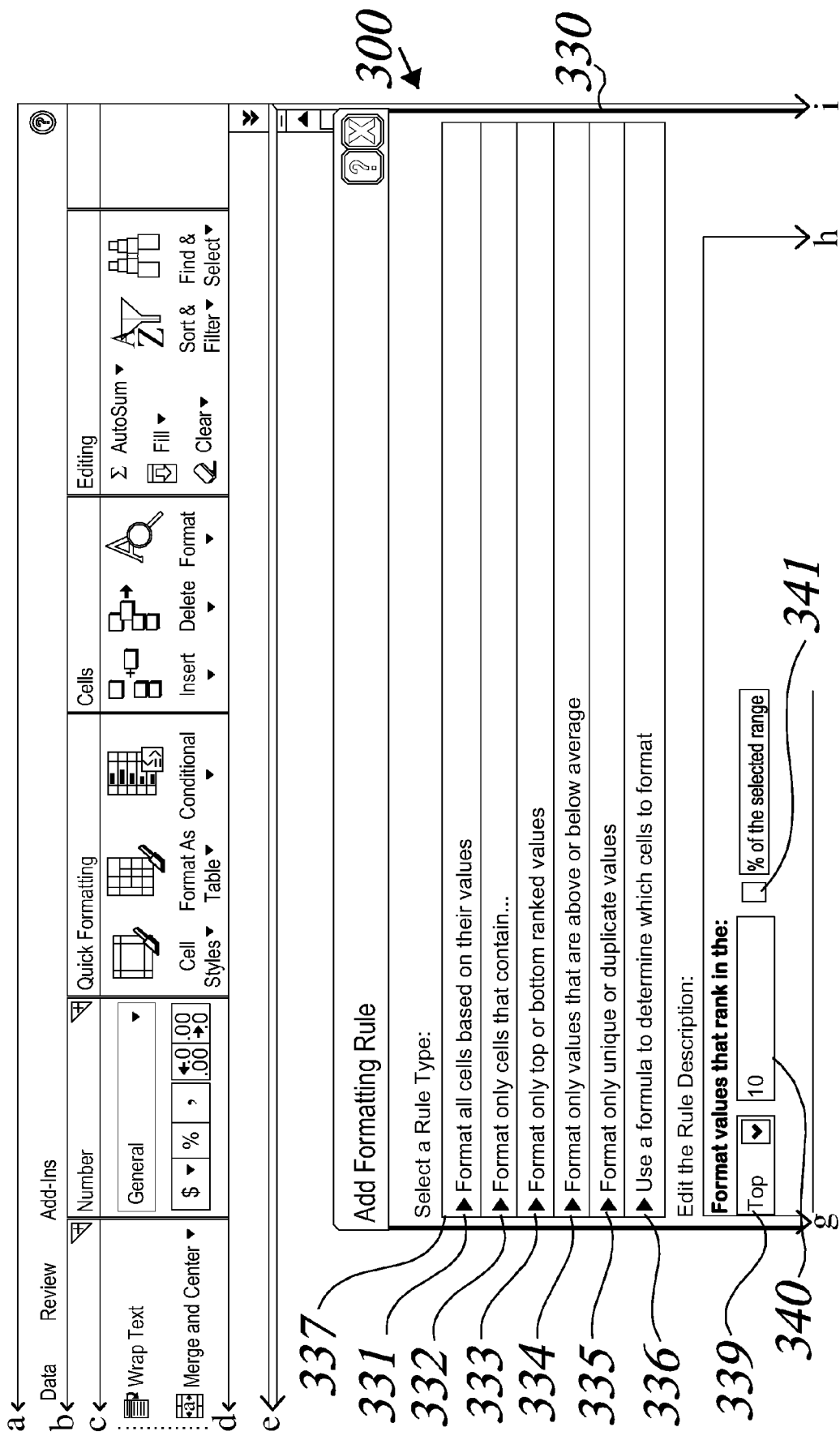
Figures 3, 3B:
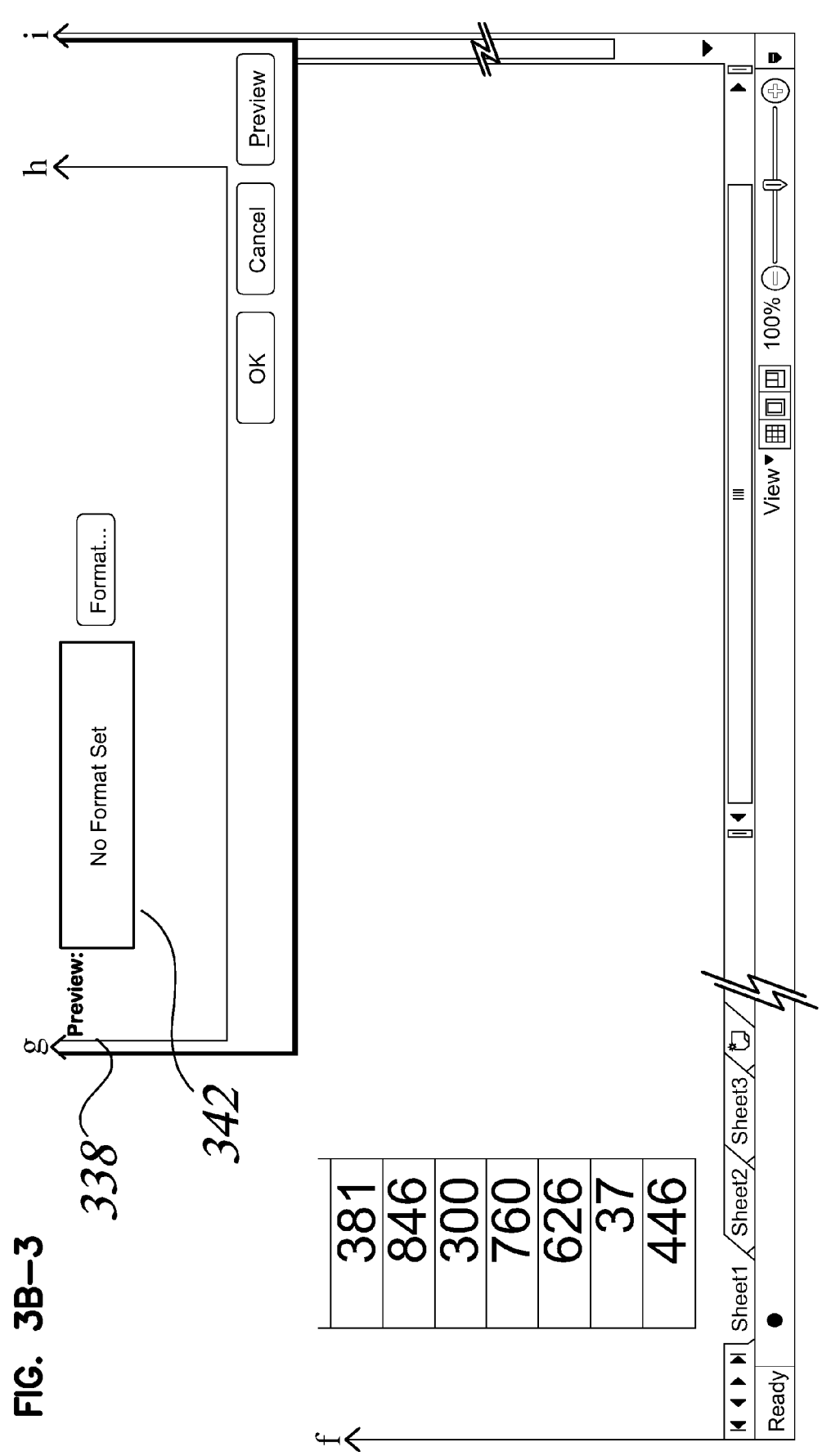

FIG. 3B (including FIGS. 3B-1, 3B-2, and 3B-3) is a block diagram illustrating a more advanced view of a user interface 300 that provides a user with the ability to apply multiple conditional formatting rules to a cell or range of cells within a user interface, in accordance with an embodiment of the present invention. The pop-up window 330 provided in the user interface 300 provides the ability for a user to select multiple conditional formatting rules based on rule types, provided in a rule type window 337, and specifies the parameters and formats to be used in evaluating a rule, provided via a criteria window 338. Examples of rule types include, but are not limited to, "Format all cells based on their values" 331, "Format only cells that contain . . . " 332, "Format only top or bottom ranked values" 333, "Format only values that are above or below the average" 334, "Format only unique or duplicate values" 335, and "Use a formula to determine which cells for format" 336.

Selection of one of the rule types 331-336 results in the criteria window 338 providing the user with the appropriate parameter selections for the predefined rule associated with the selected rule type. Thus, if a user selects the rule type "Format only top or bottom ranked values" 333, the criteria window 338 provides the user with the different parameter options that may be used with the selected rule type. For example, a user may specify, via a drop-down list 339, whether to identify the top, bottom, or middle cells in the range of selected cells and, via text entry space 340, how many of those cells are to be evaluated as TRUE. Optionally, a user may specify, by selecting a checkbox 341, that a percentage of the cells are to be evaluated as TRUE.

In addition to specifying the parameters that are to be used in evaluating the selected conditional formatting rule, the criteria window 338 allows the user to specify the formatting that is to be applied to the cells that are evaluated as TRUE. Any type of formatting 342 may be applied to a cell including, but not limited to, bold, italics, underline, border, shadow, fill color, alignment, etc.

As noted above, any number of conditional formatting rules may be applied to a cell and/or range of cells. In implementation, the total number of conditional formatting rules is only limited by the processing power of the device that is providing the user interface and/or performing the evaluation. Additionally, regardless of the number of conditional formatting rules, each rule may be evaluated and the associated formatting applied to a cell, regardless of whether other rules have already been evaluated as TRUE for the same cell.

Figures 1, 4:
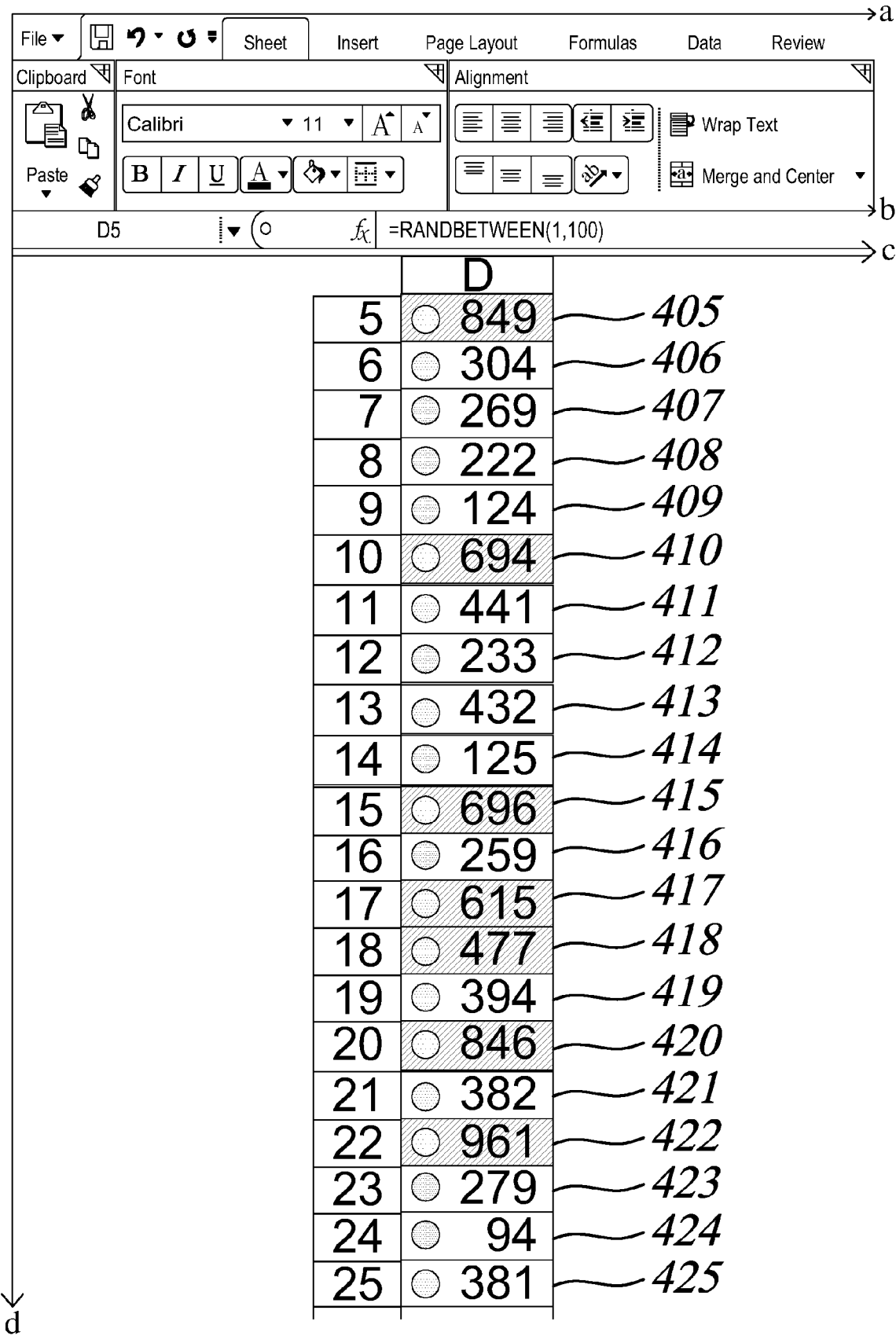
FIG. 4 is a block diagram of a user interface illustrating the evaluation of two conditional formatting rules for the same range of cells and the application of formats associated with each conditional formatting rule being applied to the same cells, in accordance with an embodiment of the present invention.
Figures 2, 4:
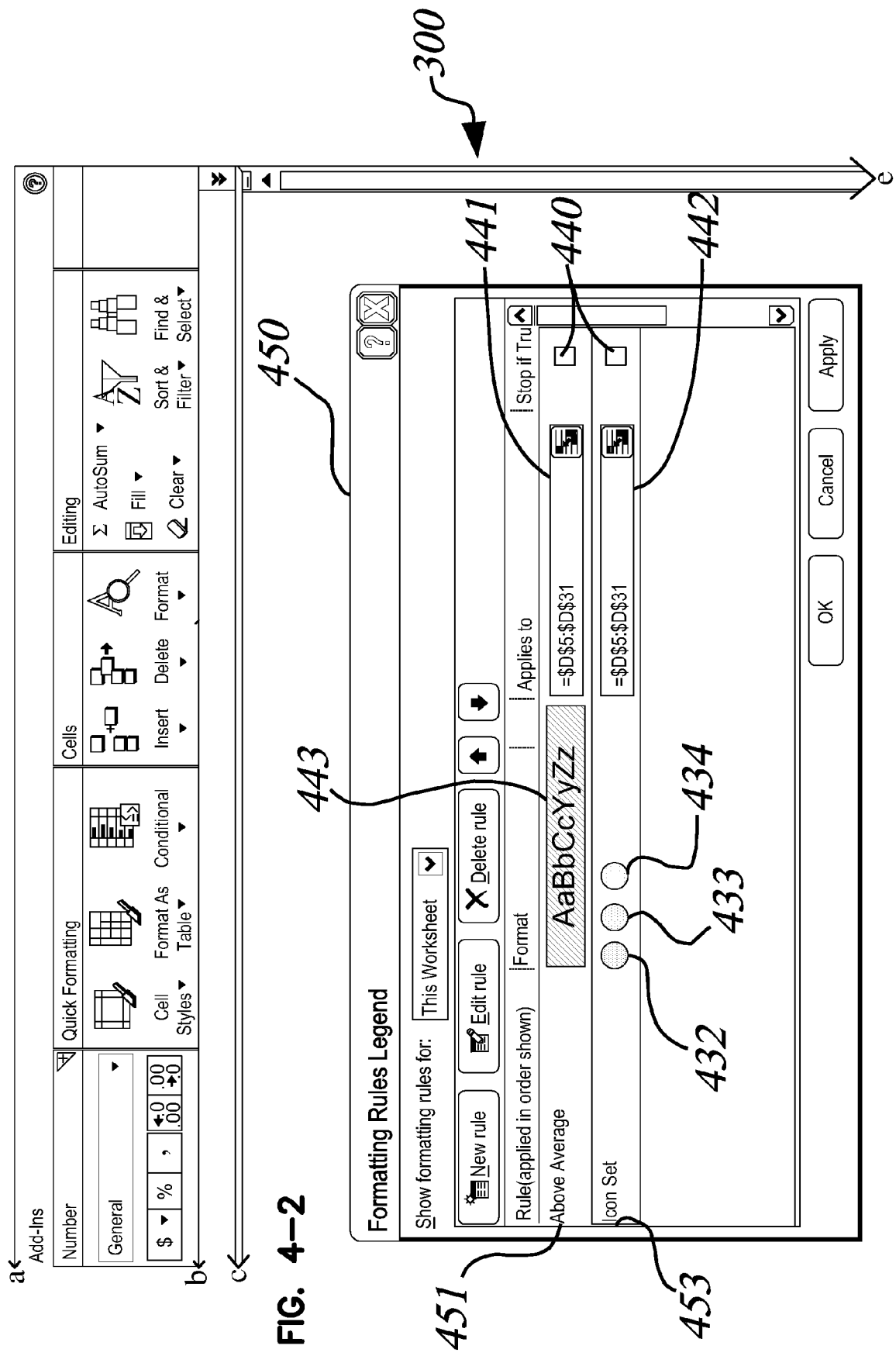
Figures 3, 4:
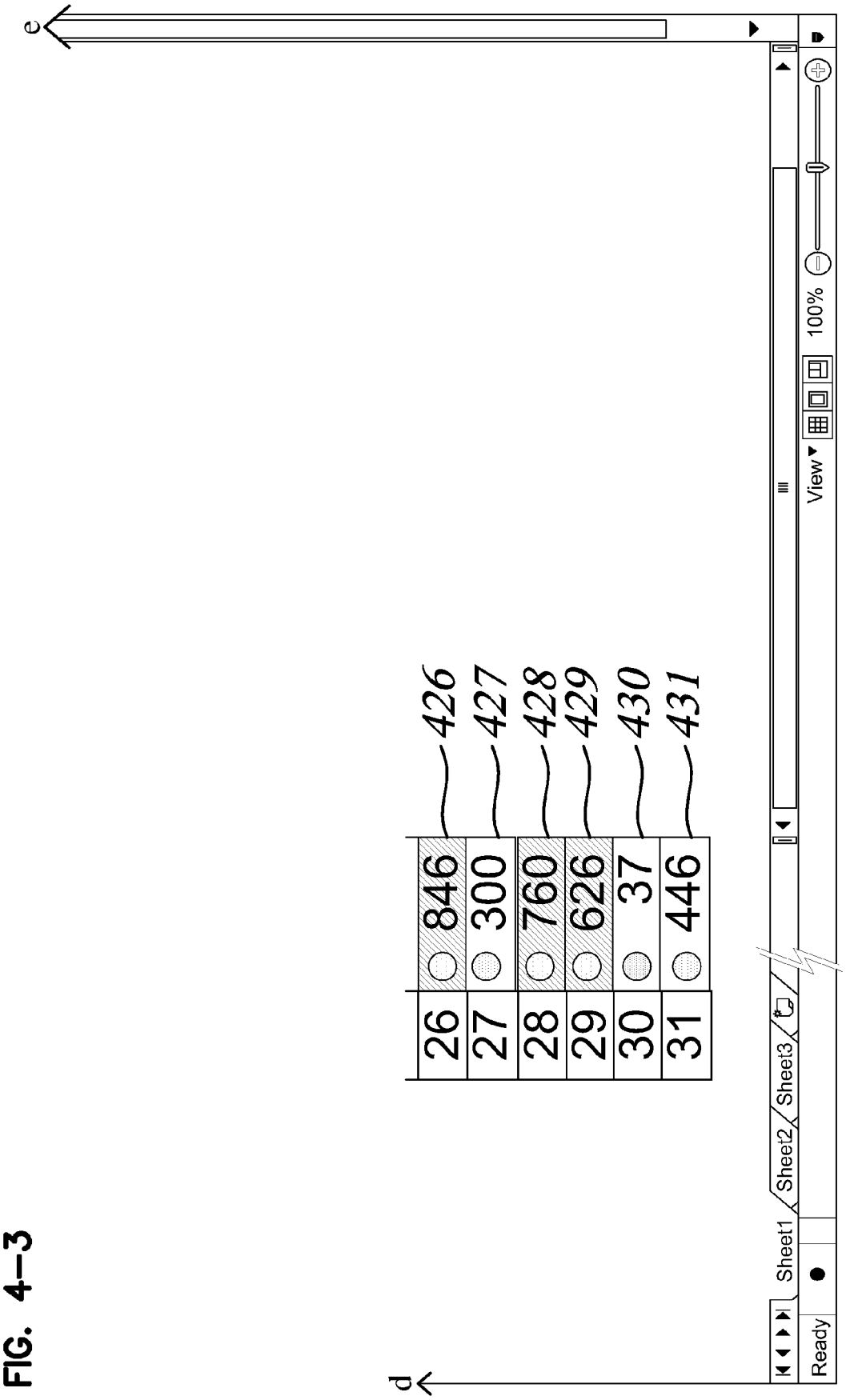

FIG. 4 (including FIGS. 4-1, 4-2, and 4-3) is a block diagram of a user interface illustrating the evaluation of two conditional formatting rules for the same range of cells and the application of formats associated with each conditional formatting rule being applied to the same cells, in accordance with an embodiment of the present invention. As noted in the Background section, in existing user interfaces, after a conditional formatting rule is evaluated as TRUE for a particular cell, any additional conditional formatting rules associated with that cell are not evaluated. In contrast, embodiments of the present invention evaluate all conditional formatting rules for a particular cell and apply the formatting for each rule, provided that the formatting does not conflict with a higher priority rule.

In one example, rules are prioritized on a user interface level and evaluated in order of priority. If a high priority rule evaluates as TRUE for a cell and applies a format to that cell, a lower priority rule that evaluates as TRUE will not apply a conflicting format to that same cell. However, if the formats do not conflict, both formats may be applied to the cell.

Conditional formatting rules created for one or more cells of a user interface may be viewed collectively for the user interface via a "Formatting Rules Legend" window 450. The rules for a user interface 300 are evaluated based on priority, regardless of the range of cells to which they apply. In an alternative embodiment, rules may be given priority on a cell-by-cell basis and are evaluated cell-by-cell.

Referring to FIG. 4, the rule identified first in the Formatting Rules Legend window 450 may be assigned the highest priority. Alternatively, the Formatting Rules Legend may display a priority number for each conditional formatting rule. Regardless of the means for identifying rule priority, conditional formatting rules may be re-prioritized automatically or by a user. For example, if a user adds a new rule, it may be given the highest priority (or lowest priority) for the conditional formatting rules associated with the user interface and each of the existing conditional formatting rules may be automatically re-prioritized accordingly. Alternatively, a user, via the Formatting Rules Legend 450, may re-prioritize currently existing rules.

As illustrated in FIG. 4, two rules, "Above Average" 451 and "Icon Set" 453, have been associated with the user interface 300. Each of the associated conditional formatting rules 451, 453 is applied to the same range of cells D5 through D31, as shown by range windows 441, 442. While this example illustrates the application of two rules to the same range of cells within the user interface, embodiments of the present invention are not so constrained. For example, the conditional formatting rule "Above Average" 451 may be applied to cells D5-D31, E7, and F1-F15, while conditional formatting rule 453 may be applied to cells D11-D40, H9-H22, and O1-O5. Additionally, a user may modify the range for a particular conditional formatting rule by modifying the range in the Applies To window 441, 442.

Regardless of the associated cells, the rule with the highest priority is evaluated first for all cells associated with that rule and the formatting applied to those cells. Subsequently, the rule with the next highest priority is evaluated and the formatting applied, as appropriate.

The parameters for the Above Average 451 rule are predefined for the rule and simply specify that cells containing values above the average of values in the range of cells are to be formatted as specified by the associated format. The formatting 443 associated with the conditional formatting rule Above Average 451 will apply a hatching to all cells in which the value is above the average for the cells within the range of associated cells (D5 through D31). The formatting associated with a conditional formatting rule may be modified by a user selecting in the formatting box 443, a different format for the rule.

In evaluating the Above Average rule 451, the average for the values contained in the range of cells (in this example, the resulting average being 447.85) is computed and the appropriate formatting is applied to those cells that include a value above that average. Because the Above Average 451 rule is the highest priority rule for the user interface, the formatting is applied to all cells in the associated range that evaluate as TRUE. Thus, cells D5 405, D10 410, D15 415, D17 417, D18 418, D20 420, D22 422, D26 426, D28 428, and D29 429 will have a hatching format applied to the cell, as they each contain a value that is above the average value for the associated range of cells.

Upon completion of the evaluation of the Above Average 451 rule, the rule with the second highest priority is evaluated and the appropriate formatting applied to cells within the range of associated cells, provided that the formatting does not conflict with formatting that was applied by a higher priority conditional formatting rule. In one embodiment, while formatting applied to a cell by a higher priority rule may not be overwritten with a conflicting format of a lower priority rule, a format applied manually by a user may be overwritten by a format associated with a conditional formatting rule. In an alternative embodiment, a user may specify that a manually applied format is not to be overwritten by a format from a conditional formatting rule, regardless of priority. Alternatively, a user may specify which priority conditional formatting rules may overwrite a conflicting format applied manually and which priority conditional formatting rules cannot overwrite manually applied formatting.

Referring again to FIG. 4, the rule with the second highest priority is the "Icon Set" 453 conditional formatting rule. The icon set conditional formatting rule may utilize default parameters or utilize parameters specified by a user. In this example, the parameters being utilized is a default of three icons in which cells with a value in the bottom one third of values in the range of cells is applied to an icon with dense dots 432, cells with the middle third of values in the range of cells are applied to an icon with medium density dots 432, and cells with a value in the top third of values in the range of cells are applied to an icon with light density dots 433. Because the formatting to be applied as part of the evaluation of the Icon Set 453 rule does not conflict with the formatting applied by the higher priority Above Average 451 rule, the formatting of the icons may be assigned to the cells. As a result, each of the cells 405-431 is assigned an icon corresponding to the appropriate value matching the threshold assigned to the Icon set rule 453. Cells containing values in the bottom third of the values—namely, D7 407, D8 408, D9 409, D12 412, D14 414, D16 416, D23 423, D24 424, and D30 430—are configured to display a dense icon next to the value. Cells containing values in the middle third of the values—namely, D6 406, D11 411, D13 413, D17 417, D18 418, D19 419, D21 421, D25 425, and D31 431—are configured to display a medium density icon next to the value. Cells containing values in the top third of the values—namely, D5 405, D10 410, D15 415, D20 420, D22 422, D26 426, D28 428, and D29 429—are configured to display a lightly dense icon next to the value.

As can be seen from FIG. 4, the evaluation of both conditional formatting rules results in two different types of formatting being applied to the evaluated cells. As such, cells D5 405, D10 410, D15 415, D17 417, D18 418, D20 420, D22 422, D26 426, D28 428, and D29 429, have been formatted to include both hashing and an icon.

In determining if multiple formatting types can be applied to the same cell, formatting may be grouped into conflicting categories such that if one format in a group is applied to a cell, another format in the same group cannot be applied to the same cell. Like formats are included in the same group. For example, one formatting group, called FILL, may include hatching the cell body, coloring the cell body a particular color, etc. However, some format types that are commonly considered similar, such as bold and italics, do not conflict with one another and, as a result, are not included in the same formatting group.

In addition to being able to provide as many conditional formatting rules as computationally possible, a user may specify whether lower conditional formatting rules should be evaluated if a particular conditional formatting rule evaluates to TRUE. In one embodiment, this may be identified by a user selecting a "Stop if True" box 440 associated with a conditional formatting rule displayed in the Formatting Rules Legend window 450. For purposes of the description, indicating that subsequent conditional formatting rules should not be evaluated, is referred to herein as "Stop if True." Stop if True refers to any indication or flag, etc., that specifies that lower priority rules are not to be evaluated for a cell if a higher priority rule has been evaluated to be TRUE. In one embodiment, a Stop if True may be applied on a per conditional formatting rule, per cell, basis. As such, multiple conditional formatting rules may be applied to a cell or range of cells and any combination of those rules with any combination of cells may be selected for Stop if True.

If Stop if True 440 is selected for a particular conditional formatting rule, as that rule is evaluated, for each cell in which the conditional formatting rule evaluates to TRUE, it is indicated that any subsequent, or lower priority, conditional formatting rules associated with that cell are not to be evaluated for that cell. In FIG. 4, if a user selects Stop if True 440 for the Above Average 451 rule, for each cell in which that rule evaluated to TRUE, the lower priority conditional evaluation rule, Icon Set 453, is not evaluated. As a result, the conditional formatting rule Icon Set 453 is not evaluated for cells D5 405, D10 410, D15 415, D17 417, D18 418, D20 420, D22 422, D26 426, D28 428, and D29 429.

FIG. 5 (including FIGS. 5-1, 5-2, and 5-3) is a block diagram of a user interface illustrating the application and evaluation of multiple conditional formatting rules in which some format types are not applied to cells because of conflicting format types of higher priority conditional formatting rules, according to an embodiment of the present invention. Continuing with the example provided in FIG. 4, three additional conditional formatting rules are defined for the range of cells D5-D31 505-531. In particular, the conditional formatting rules of Data Bar 541, Below Average 542, and Top 5 543 are added to the list of conditional formatting rules for the user interface 300. Similar to the Above Average 451 and Icon Set 453 conditional formatting rules, the Data Bar 541, Below Average 542, and Top 5 543 conditional formatting rules each have parameters and formatting types associated with the particular rule that is used when the conditional formatting rule is evaluated. In particular, the Data Bar 541 rule includes the parameters of identifying, via a sized data bar in each cell, the value of that cell with respect to other cells within the range. As such, each cell in the range of cells for Data Bar 541 will always evaluate to TRUE. However, in this example, the format type 544 of data bar 541 and the format type 443 of Above Average 451 are in the same formatting group. For cells that evaluate as TRUE for the Above Average 541 rule and have a hashing format 443 applied, the data bar 541 formatting 544 is not applied because it is a conflicting format of a lower priority conditional formatting rule. As such, the data bar formatting is not applied to cells D5 505, D10 510, D15 515, D17 517, D18 518, D20 520, D22 522, D26 526, D28 528, and D29 529.

In contrast, the formatting types associated with the conditional formatting rules of Below Average 542 and Top 5 543 do not conflict with any formatting types of the higher priority conditional formatting rules. As a result, the format type for those conditional formatting rules will be applied to all cells that evaluate to TRUE.

Performing conflict resolution on a cell-by-cell basis to ensure that a formatting type of a higher priority conditional formatting rule is not replaced by a conflicting formatting type of a lower priority conditional formatting rule provides the ability to evaluate multiple conditional formatting rules and apply multiple different formatting types without losing formatting information for higher priority conditional formatting rules.

Figure 6:
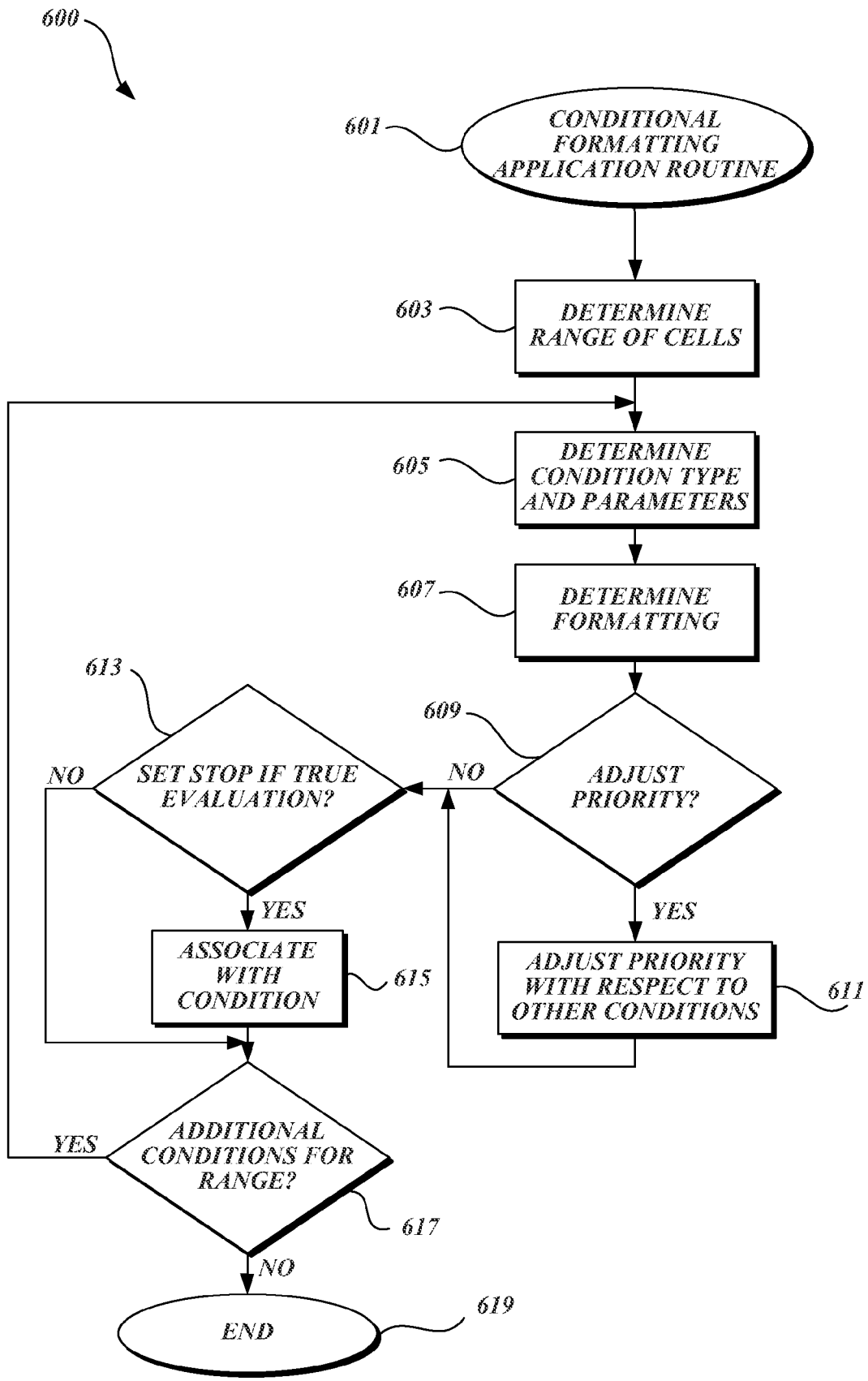
FIG. 6 is a flow diagram of a conditional formatting application routine for applying multiple conditional formats to one or more cells contained within a user interface, in accordance with an embodiment of the present invention.

FIG. 6 is a flow diagram of a conditional formatting application routine for applying multiple conditional formatting rules to one or more cells contained within a user interface, in accordance with an embodiment of the present invention. The conditional formatting application routine 600 begins at block 601. At block 603, a range of cells for which one or more conditional formatting rules is to be applied is determined. The range of cells may be any combination of cells contained within the user interface. For example, the range of cells may be a continuous range within a column, cells from multiple columns, cells within a continuous range of rows, etc.

At block 605, a condition type and parameters for a conditional formatting rule are determined for the range of cells. As discussed above, a condition type identifies the type of a conditional formatting rule. The parameters are associated with the identified condition type and may include threshold values for which these cells are to be evaluated. In addition to determining the condition type and parameters, at block 607 the formatting to be applied to the cell if the condition is evaluated to TRUE is determined.

At decision block 609, a determination is made as to whether the priority for the conditional formatting rule being applied is to be adjusted. As discussed above, the priority for a conditional formatting rule may be automatically applied or manually adjusted by the user. For automatic application of priorities, any basis may be used. For example, the most recently added conditional formatting rules may be given the highest priority. Alternatively, the oldest conditional formatting rules may be given the highest/lowest priority. If it is determined at decision block 609 that the priority for the conditional formatting rule is to be adjusted, at block 611 the priority is adjusted with respect to other defined conditions.

However, if it is determined at decision block 609 that the priority does not need to be adjusted, at decision block 613 a determination is made as to whether evaluation of conditional formatting rules should stop if that condition is evaluated to TRUE. As discussed above in FIG. 4, a user may select Stop if True to indicate that lower priority conditional formatting rules are not to be evaluated for a cell if a particular condition evaluates to TRUE. If it is determined at decision block 613 that Stop if True has been set, at block 615 that determination is associated with the conditional formatting rule for the selected range of cells.

After a determination that Stop if True is selected and that determination is applied to the range of cells, as illustrated by block 615, or if it is determined at decision block 613 that Stop if True is not selected, at decision block 617 a determination is made as to whether additional conditional formatting rules for the range of selected cells identified at block 603 is to be added. If it is determined at decision block 617 that additional conditional formatting rules are to be applied for the determined range of cells, control is returned to block 605 and the routine continues. However, if it is determined at decision block 617 that additional conditional formatting rules are not to be applied to the selected range of cells, the conditional formatting application routine 600 completes, as illustrated by block 619.

Figure 7:
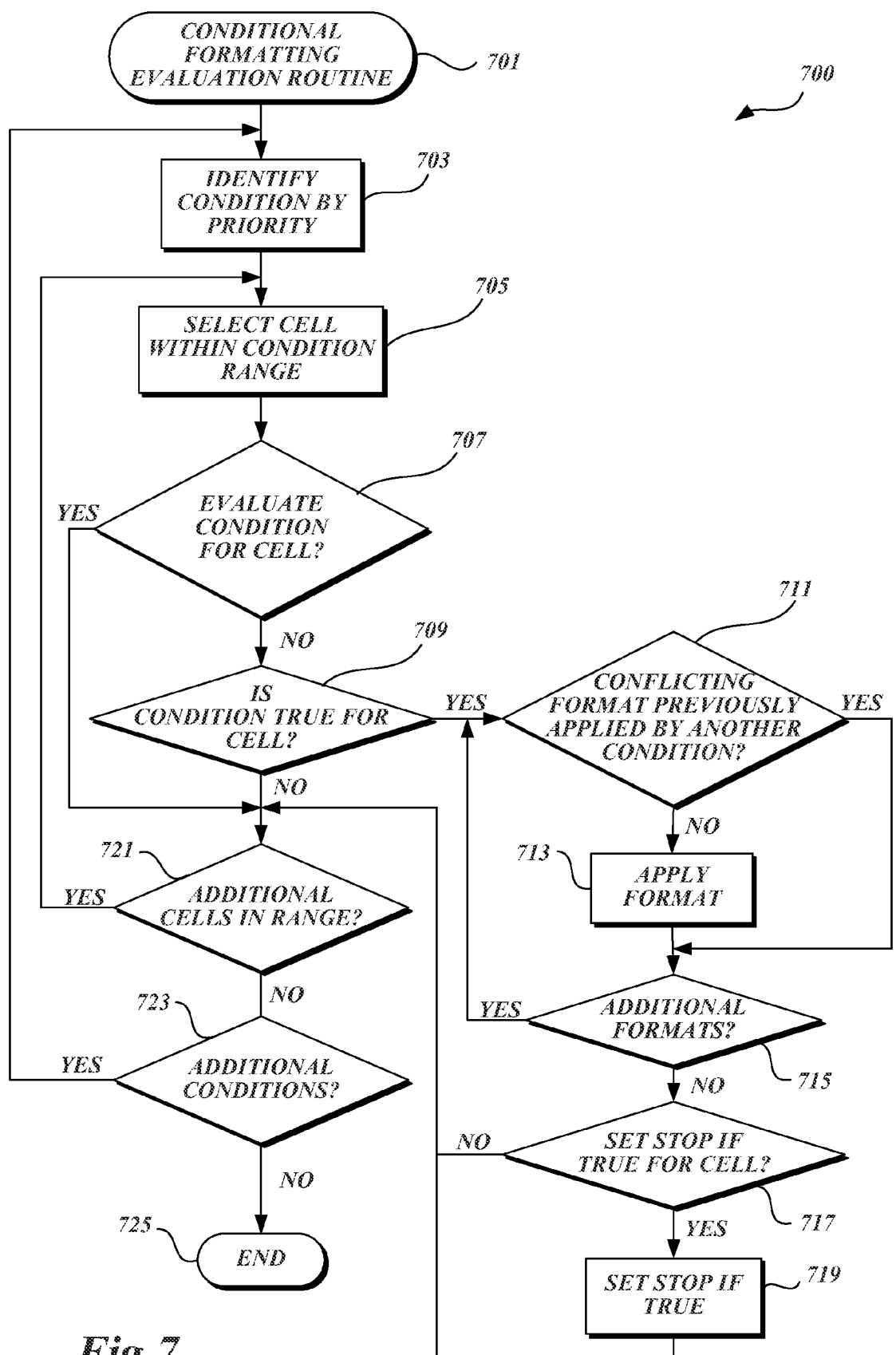
FIG. 7 is a flow diagram of a conditional formatting evaluation routine for evaluating multiple conditional formatting rules associated with a user interface, in accordance with an embodiment of the present invention.

FIG. 7 is a flow diagram of a conditional formatting evaluation routine for evaluating multiple conditional formatting rules associated with a user interface, in accordance with an embodiment of the present invention. The conditional formatting evaluation routine 700 begins at block 701. At block 703 a conditional formatting rule with the highest priority for the user interface is identified. As discussed above, priority may be assigned to a conditional formatting rule automatically or by a user identifying a priority that is to be applied to the conditional formatting rule. As discussed above, conditional formatting rules are given a priority at a user interface level. However, in an alternate embodiment, conditional formatting rules may be given a priority at a cell-by-cell level. Upon identification of a conditional formatting rule that is to be evaluated, at block 705 a cell associated with the conditional formatting rule is selected for evaluation.

For the selected cell, at decision block 707, a determination is made as to whether evaluation of the conditional formatting rule is to be applied. In particular, if a previous conditional formatting rule is evaluated to TRUE and Stop if True has been selected (i.e., a user has indicated that lower priority conditional formatting rules are not to be evaluated if that condition is evaluated to TRUE), it will be determined at decision block 707 that this evaluation is not to be completed for that cell.

If it is determined at decision block 707 that the cell is to be evaluated, at decision block 709, it is determined whether the conditional formatting rule evaluates to TRUE for the selected cell. If it is determined at decision block 709 that the evaluated condition is TRUE for the selected cell, at decision block 711 a determination is made whether a conflicting format has previously been applied to that cell by another condition. In an embodiment of the present invention, a distinguishment is made between formatting applied by a previously evaluated conditional formatting rule and formatting applied by a user. In one embodiment, if a conflicting format has been applied by a user, formatting from a conditional formatting rule may be used to replace the format applied manually.

In contrast, if a conflicting format has been applied by a higher priority conditional formatting rule, the format that is to be applied by the currently evaluated conditional formatting rule is not applied as it replaces or conflicts with the previously applied format. If it is determined at decision block 711 that a conflicting format has not been applied by another conditional formatting rule, at block 713 the format is applied to the cell. If the formatting to be applied is a Boolean format (in other words, it is either TRUE or FALSE) and is not dependent on other cells within the range, the format may be immediately applied to the cell. However, if the format to be applied is dependent upon the evaluation of other cells within the range for the condition, the evaluation may be determined based on the other cells within the range and then the format is applied for all cells within that range.

After application of the format at block 713, or if it is determined at decision block 711 that a conflicting format has previously been applied, at decision block 715 a determination is made as to whether additional formats for the currently evaluated conditional formatting rule are to be applied to the cell selected at block 705. If it is determined at decision block 715 that additional formats are to be applied, control returns to decision block 711 and the conditional formatting evaluation routine 700 continues. However, if it is determined at decision block 715 that there are no additional formats to be applied to the selected cell based on the currently evaluated condition, at decision block 717 a determination is made as to whether Stop if True is to be set for the evaluated cell. If it is determined at decision block 717 that Stop if True is to be set, at block 719 the cell is identified as having completed evaluation. In one embodiment, this may be accomplished by setting a flag, identified in this application as a Stop if True flag.

If it is determined at decision block 717 that Stop if True is not to be set, after Stop if True has been set at block 719 or if it is determined at decision block 707 that evaluation for the selected cell is not to be completed, at decision block 721 a determination is made as to whether there are additional cells within the range associated with the current conditional formatting rule that need to be evaluated. If it is determined at decision block 721 that there are additional cells within the range to be evaluated, control returns to block 705, and the conditional formatting evaluation routine 700 continues.

However, if it is determined at decision block 721 that there are no additional cells within the range associated with the conditional formatting rule identified at block 703, at decision block 723 a determination is made as to whether additional conditional formatting rules for the user interface are to be evaluated. If it is determined at decision block 723 that additional conditional formatting rules for the user interface are to be evaluated, control returns to block 703 and the conditional formatting evaluation routine 700 continues. If it is determined at decision block 723 that no additional conditional formatting rules for the user interface are to be evaluated, the conditional formatting evaluation routine 700 completes, as illustrated by block 725.

In an alternative embodiment to that described with respect to FIG. 7, each condition for each cell may be evaluated first, regardless of priority, and the results retained or stored, based on priority as they are evaluated. After all conditions for a cell have been evaluated and retained in order of priority, the appropriate formatting may be determined for that cell based on the retained evaluations. As discussed above, conditions with a higher prior that evaluated to true would have formatting applied but conditions with lower priority that would resulting in a conflicting format would not be applied. Additionally, prior to applying the formatting for the evaluation conditions, it can determined if a higher priority condition is associated with a Stop if True and if so, all lower priority conditions may be ignored.

Figure 8A:
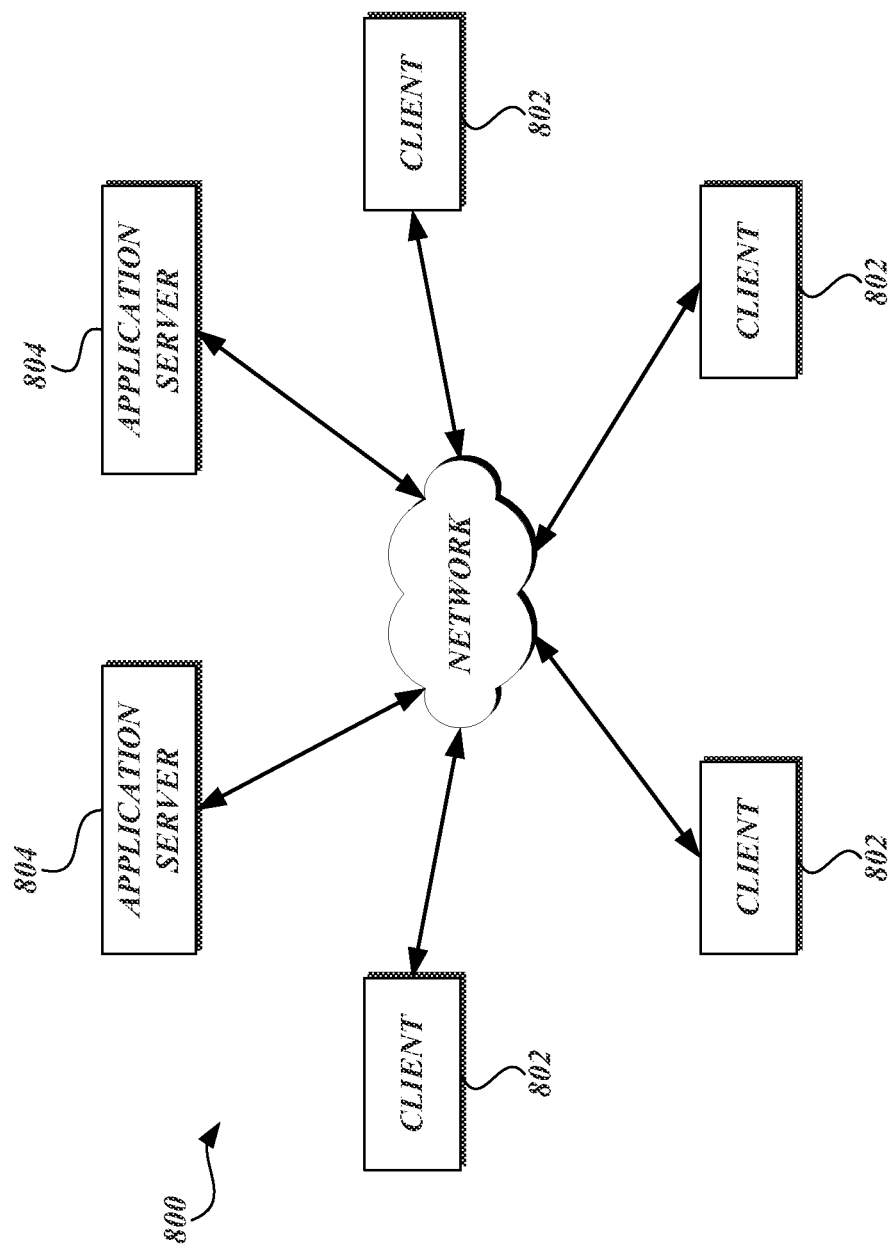
FIG. 8A is a block diagram illustrative of a network environment for providing a network-based user interface.
Figure 8B:
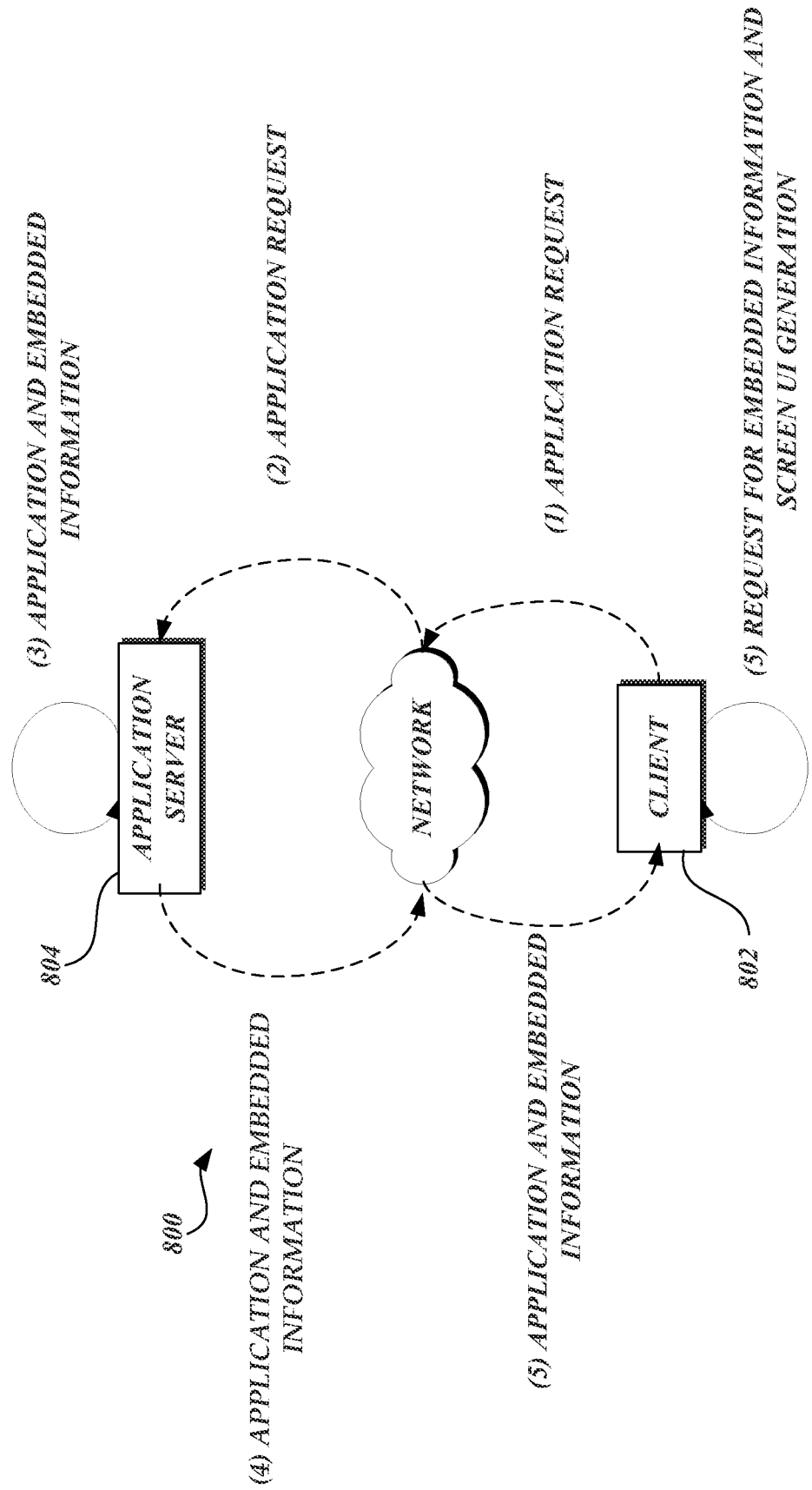
FIG. 8B is another block diagram illustrative of a network environment for providing a network-based user interface.

The embodiments described above may be implemented on a stand-alone computing device or as part of a networked environment in which some or all of the interface, evaluation of conditional formatting rules, and/or data viewed through the user interface is obtained from or computed by other networked computing devices. With reference now to FIGS. 8A and 8B, an illustrative networked operating environment 800 will be described.

With reference to FIG. 8A, the operating environment 800 includes a plurality of receiving computing devices, such as client computing devices 802, that can communicate via a communication network, such as the Internet or an intranet. In an illustrative embodiment, client computing devices 802 can include a software application, such as a browser software application, to facilitate communication via the network. The operating environment also includes one or more sending computing devices, such as an application server 804, that communicate with the client computing devices 802. Application servers 804 can provide the user interface to the client computing devices 802. Additionally, application servers 804 can provide the user interface 200 that can be displayed on the client computing devices 802. One skilled in the relevant art will appreciate that the client computing device 802 and/or application servers 804 can correspond to a variety of computing devices, such as personal computers, hand-held computers, mobile computers, mobile telephones, server computers, and the like.

With reference to FIG. 8B, in an illustrative embodiment, the client computing devices 802 can generate a request for a user interface application via the communication network. The application request is received at an appropriate application server 804, which generates or otherwise retrieves the appropriate code to generate the user interface 200 on the client computing device. The code is then transmitted to the client computing device 802.

While illustrative embodiments have been illustrated and described, it will be appreciated that various changes can be made therein without departing from the spirit and scope of the invention.

What is claimed is:

1. A method for evaluating a plurality of conditional formatting rules applied to a user interface, the method comprising:

identifying first and second conditional formatting rules for formatting cells in a user interface, wherein the first conditional formatting rule has a first priority and a first formatting, wherein the second conditional formatting rule has a second priority and a second formatting, and wherein the first priority is greater than the second priority;

identifying a cell contained in the user interface associated with the first and second conditional formatting rules;

determining with the computing device if the first and second conditional formatting rules are satisfied for the cell; and if determined that the first and second conditional formatting rules are satisfied, applying the first formatting to the cell based on the ranking of the first priority and determining whether the second formatting and the first formatting belong to a single group of conflicting formats prior to applying the second formatting associated with the second conditional formatting rule.

2. The method of claim 1, further comprising: determining if the first conditional formatting rule includes an indication that no additional evaluations should be completed for the cell.

3. The method of claim 1, wherein the first and second conditional formatting rules are applied on a sheet basis.

4. The method of claim 1, wherein the first conditional formatting rule is evaluated for a first set of cells within the sheet and the second conditional formatting rule is evaluated for a second set of cells within the sheet.

5. The method of claim 1, wherein the first conditional formatting rule is evaluated for a first set of cells within the sheet and the second conditional formatting rule is also evaluated for the first set of cells within the sheet.

6. The method of claim 5, wherein when the first conditional formatting rule is evaluated as TRUE for a first cell within the first set of cells, a first formatting type is applied to the first cell; and wherein when the second conditional formatting rule is evaluated as TRUE for the first cell within the first set of cells, a second formatting type is also applied to the first cell.

7. The method of claim 6, wherein the first formatting is of a first formatting type, and the second formatting is of a second formatting type, and wherein the first formatting type is different than the second formatting type.

8. The method of claim 1, wherein the user interface is configured to receive inputs from a user to modify the priorities of the plurality of conditional formatting rules.

9. The method of claim 1, wherein the second formatting is applied only if the second formatting does not conflict with the first formatting.

10. A computer-readable memory having computer executable components for applying and evaluating multiple conditional formatting rules, comprising:

a conditional formatting rules control component operable by a computing device to assign priority ranks to first and second conditional formatting rules for formatting cells in a user interface;

a conditional formatting rules evaluation component operable by the computing device to evaluate the first and second conditional formatting rules for a cell of a user interface; and a formatting resolution component operable by the computing device to determine whether a first formatting, a second formatting, or both the first formatting and the second formatting should be applied to the cell based on the priority ranks and the evaluation of the first and second conditional formatting rules, including determining whether the second formatting and the first formatting belong to a single group of conflicting formats prior to applying the second formatting associated with the second conditional formatting rule.

11. The computer-readable memory of claim 10, wherein the formatting resolution component applies the first formatting if the first conditional formatting rule is determined to have a higher priority rank than the second conditional formatting rule.

12. The computer-readable memory of claim 10, wherein the conditional formatting rules evaluation component identifies the cell within a range of cells associated with the first conditional formatting rule and determines if the conditional formatting rule should be evaluated for the cell.

13. The computer-readable memory of claim 10, wherein the formatting resolution component is operable by the computing device to determine if a one of the first and second conditional formatting rules having a higher priority rank includes an indication that no additional evaluations should be completed for the cell.

14. The computer-readable memory of claim 13, wherein the formatting resolution component is further operable by the computing device to apply only formatting associated with the one of the first and second conditional formatting rules having a higher priority rank if the indication that no additional evaluations should be completed for the cell is included.

15. The computer-readable memory of claim 10, wherein the conditional formatting rules evaluation component is configured to evaluate more than two conditional formatting rules.

16. A method for evaluating a plurality of conditional formatting rules applied to a user interface, the method comprising:
identifying first and second conditional formatting rules for formatting cells in a user interface, wherein the first conditional formatting rule is assigned a first priority and is associated with a first formatting, wherein the second conditional formatting rule is assigned a second priority and is associated with a second formatting, and wherein the first priority is greater than the second priority;
identifying a cell contained in the user interface, the cell being associated with the first and second conditional formatting rules;
determining with a computing device whether both of the first and second conditional formatting rules are satisfied for the cell;
if both are satisfied, determining with the computing device whether formatting associated with the first and second conditional formatting belong to a single group of conflicting formats prior to applying the formatting associated with the first and second formatting;
if the formatting does not conflict, applying the first and second formatting to the cell; and
if the formatting does conflict, applying only the first formatting to the cell.

17. The method of claim 16, wherein determining whether formatting conflicts comprises determining if the formatting types of the first and second conditional formatting rules are the same, and if so, determining that the formatting does conflict.

18. The method of claim 16, further comprising determining that the first conditional formatting rule has a highest priority of the plurality of conditional formatting rules.

19. The method of claim 16, wherein the first conditional formatting rule includes a first condition type and a first parameter, and wherein the second conditional formatting rule includes a second condition type and a second parameter.

20. The method of claim 16, further comprising determining whether the first and second conditional formatting rules should both be evaluated for the cell before determining whether the first and second conditional formatting rules are satisfied.

21. A method for evaluating a plurality of conditional formatting rules applied to a user interface, the method comprising:
identifying first and second conditional formatting rules for formatting cells in a user interface, the first conditional formatting rule being assigned a first priority and being associated with a first formatting, the second conditional formatting rule being assigned a second priority and being associated with a second formatting, and the first priority being greater than the second priority;
identifying a cell contained in the user interface, the cell being associated with the first and second conditional formatting rules;
determining with a computing device whether the first conditional formatting rule is satisfied for the cell;
if the first conditional formatting rule is satisfied, applying the first formatting associated with the first conditional formatting rule to the cell; and
determining whether the second formatting and the first formatting belong to a single group of conflicting formats prior to applying the second formatting associated with the second conditional formatting rule.

22. The method of claim 21, wherein the second formatting associated with the second conditional formatting rule is not applied to the cell.

23. The method of claim 21, further comprising an indication to stop formatting if the first conditional formatting rule evaluates to TRUE.

24. The method of claim 21, further comprising determining if the first conditional formatting rule includes an indication that at least the second conditional formatting rule should not be evaluated for the cell.

25. A computer-readable memory having computer executable components for applying and evaluating multiple conditional formatting rules, comprising:
a conditional formatting rules control component operable by a computing device to assign priority ranks to a plurality of conditional formatting rules for formatting one or more cells in a user interface wherein a first conditional formatting rule has a priority rank greater than the priority ranks of the plurality of conditional formatting rules;
a conditional formatting rules evaluation component operable by the computing device to evaluate the plurality of conditional formatting rules for the one or more cells in a user interface; and
a formatting resolution component operable by the computing device to determine whether to apply a first formatting associated with the first conditional formatting rule to the one or more cells based on the priority ranks and the evaluation of the plurality of conditional formatting rules, including determining whether the second formatting and the first formatting belong to a single group of conflicting formats prior to applying the second formatting associated with the second conditional formatting rule.

26. The computer-readable memory of claim 25, wherein the formatting resolution component does not apply a second formatting associated with a second conditional formatting rule to the one or more cells.

27. The computer-readable memory of claim 25, wherein the first formatting includes one or more font attributes that are associated with the first conditional formatting rule.

28. The computer-readable memory of claim 25, wherein the conditional formatting rules evaluation component identifies the one or more cells within a range of cells associated with the first conditional formatting rule and determines if the conditional formatting rule should be evaluated for the one or more cells.

29. The computer-readable memory of claim 25, wherein the first conditional formatting rule includes an indication that at least one of the plurality of conditional formatting rules should not be evaluated for the one or more cells.

30. The computer-readable memory of claim 25, wherein the formatting resolution component is operable by the computing device to determine if the first conditional formatting rule includes an indication that no additional evaluations should be completed for the cell.

31. The method of claim 21, wherein the first formatting includes one or more font attributes that are associated with the first conditional formatting rule.

\* \* \* \* \*